United States Patent
Chigapov et al.

(10) Patent No.: US 9,597,664 B2
(45) Date of Patent: Mar. 21, 2017

(54) LNT AND SCR CATALYSTS FOR COMBINED LNT-SCR APPLICATIONS

(75) Inventors: Albert N. Chigapov, Aachen (DE); Robert Ukropec, Aachen (DE); Brendan Patrick Carberry, Aachen (DE); Nina Shishkina, legal representative, Krasnoyarsk (RU)

(73) Assignee: Ford Global Technologies, LLC, Dearborn, MI (US)

( * ) Notice: Subject to any disclaimer, the term of this patent is extended or adjusted under 35 U.S.C. 154(b) by 1373 days.

(21) Appl. No.: 13/358,708

(22) Filed: Jan. 26, 2012

(65) Prior Publication Data

US 2012/0214663 A1 Aug. 23, 2012

(30) Foreign Application Priority Data

Jan. 26, 2011 (EP) .................................... 11152233

(51) Int. Cl.
*B01J 29/56* (2006.01)
*B01J 29/58* (2006.01)
(Continued)

(52) U.S. Cl.
CPC .......... *B01J 23/63* (2013.01); *B01D 53/9418* (2013.01); *B01D 53/9422* (2013.01);
(Continued)

(58) Field of Classification Search
CPC ...... B01J 29/072; B01J 29/076; B01J 29/106; B01J 29/146; B01J 29/166; B01J 29/56;
(Continued)

(56) References Cited

U.S. PATENT DOCUMENTS 6,045,764 A 4/2000 Iizuka et al.
6,387,338 B1 * 5/2002 Anatoly ............. B01D 53/8628
423/239.1
(Continued)

FOREIGN PATENT DOCUMENTS

CN 1511621 A 7/2004
DE 102008043706 A1 5/2010
(Continued)

OTHER PUBLICATIONS

"LNT-SCR dual-layer catalysts optimized for lean NOx reduction by H2 and CO," Yang Zheng et al. Applied Catalysis B: Environmental 148-149 (2014), pp. 311-321.*
(Continued)

*Primary Examiner* — Patricia L Hailey
(74) *Attorney, Agent, or Firm* — Julia Voutyras; John D. Russell; B. Anna McCoy

(57) ABSTRACT

The current invention refers to the LNT and the SCR catalysts designed for combined LNT-SCR applications. LNT catalysts are based on proton-conducting oxides of fluorite structure, namely Ca (Sr)—La—Ce (Zr, Pr) mixed oxides in which up to 40 mol-% of lanthanum is replaced by calcium and/or strontium, and up to 66 mol-% of cerium is replaced by zirconium and/or praseodymium, further combined with Pt—Pd or Pt—Pd—Rh precious metal components. SCR catalysts are Cu/zeolite modified by citrate treatment or Cu—Ce, Mn—Ce or Co—Ce/modified zeolite.

16 Claims, 14 Drawing Sheets

(51) Int. Cl.
| | |
|---|---|
| *B01J 23/63* | (2006.01) |
| *B01D 53/94* | (2006.01) |
| *B01J 29/072* | (2006.01) |
| *B01J 29/076* | (2006.01) |
| *B01J 35/00* | (2006.01) |
| *B01J 37/02* | (2006.01) |
| *F01N 13/00* | (2010.01) |
| *F01N 3/035* | (2006.01) |
| *F01N 3/08* | (2006.01) |
| *F01N 3/10* | (2006.01) |
| *F01N 3/20* | (2006.01) |

(52) U.S. Cl.
CPC .......... *B01J 29/072* (2013.01); *B01J 29/076* (2013.01); *B01J 35/0006* (2013.01); *B01J 37/0203* (2013.01); *B01J 37/0205* (2013.01); *B01J 37/0242* (2013.01); *B01J 37/0246* (2013.01); *F01N 13/009* (2014.06); *B01D 2251/2062* (2013.01); *B01D 2251/2067* (2013.01); *B01D 2255/1021* (2013.01); *B01D 2255/1023* (2013.01); *B01D 2255/1025* (2013.01); *B01D 2255/2045* (2013.01); *B01D 2255/2063* (2013.01); *B01D 2255/2065* (2013.01); *B01D 2255/2073* (2013.01); *B01D 2255/20746* (2013.01); *B01D 2255/20761* (2013.01); *B01D 2255/50* (2013.01); *B01D 2255/904* (2013.01); *B01D 2255/911* (2013.01); *B01J 2229/16* (2013.01); *B01J 2229/18* (2013.01); *B01J 2229/37* (2013.01); *B01J 2523/00* (2013.01); *F01N 3/035* (2013.01); *F01N 3/0842* (2013.01); *F01N 3/106* (2013.01); *F01N 3/2066* (2013.01); *F01N 2370/02* (2013.01); *F01N 2370/04* (2013.01); *Y02T 10/24* (2013.01)

(58) Field of Classification Search
CPC ...... B01J 29/58; B01J 29/7015; B01J 29/723; B01J 29/783
USPC ................................................. 502/303, 304
See application file for complete search history.

(56) References Cited

U.S. PATENT DOCUMENTS

| | | | |
|---|---|---|---|
| 7,490,464 B2 | 2/2009 | Li et al. | |
| 8,466,083 B2 * | 6/2013 | Schmieg | B01D 53/9418 422/171 |
| 8,906,329 B2 * | 12/2014 | Ballinger | B01D 53/9418 423/213.2 |
| 2003/0021745 A1 * | 1/2003 | Chen | B01D 53/945 423/239.1 |
| 2006/0010857 A1 | 1/2006 | Hu et al. | |
| 2007/0006573 A1 | 1/2007 | Hu et al. | |
| 2007/0056268 A1 | 3/2007 | McCarthy | |
| 2007/0271908 A1 | 11/2007 | Hemingway et al. | |
| 2007/0277507 A1 | 12/2007 | Yan | |
| 2008/0072575 A1 | 3/2008 | Yan | |
| 2008/0282670 A1 | 11/2008 | McCarthy et al. | |
| 2009/0173064 A1 | 7/2009 | Ren et al. | |
| 2009/0193796 A1 | 8/2009 | Wei et al. | |
| 2009/0304566 A1 * | 12/2009 | Golden | B01D 53/9418 423/239.2 |
| 2010/0050604 A1 | 3/2010 | Hoard et al. | |
| 2010/0050613 A1 | 3/2010 | Bailey | |
| 2010/0132335 A1 | 6/2010 | Theis | |
| 2010/0266471 A1 * | 10/2010 | Xu | B01D 53/9422 423/239.2 |
| 2011/0020204 A1 * | 1/2011 | Bull | B01D 53/9418 423/239.2 |
| 2011/0219748 A1 * | 9/2011 | Akama | F01N 3/0222 60/274 |
| 2012/0029218 A1 * | 2/2012 | Kim | B01J 21/06 554/174 |
| 2012/0258852 A1 * | 10/2012 | Martinez | B01J 29/041 502/60 |
| 2014/0274665 A1 * | 9/2014 | Vaarkamp | B01J 23/22 502/74 |
| 2015/0078989 A1 * | 3/2015 | Fedeyko | B01J 37/031 423/700 |
| 2015/0151288 A1 * | 6/2015 | Rivas-Cardona | B01J 37/0225 423/700 |

FOREIGN PATENT DOCUMENTS

| | | |
|---|---|---|
| EP | 2308596 A1 | 4/2011 |
| WO | 2010022909 A1 | 3/2010 |

OTHER PUBLICATIONS

"Lean NOx reduction on LNT-SCR dual-layer catalysts by H2 and CO," Yi Liu et al. Applied Catalysis B: Environmental 132-133 (2013), pp. 293-303.*

"An overview of the production and use of ammonia in NSR + SCR coupled system for NOx reduction from lean exhaust gas," Fabien Can et al. Catalysis Today 197 (2012), pp. 144-154.*

"NOx removal over a doublt-bed NSR-SCR reactor configuration," R. Bonzi et al. Catalysis Today 151 (2010), pp. 376-385.*

ISA European Patent Office, Search Report of EP11152233.0, Jul. 13, 2012, Germany, 16 pages.

Kucherov, A. V et al., "Stability of the Square-Planar CU2+ Sites in ZSM-5: Effect of Preparation, Heat Treatments, and Modification," Journal of Catalysis, vol. 186, pp. 334-344, 1999, 11 pages.

Lin, Xiuying et al., "A Novel Method for Enhancing On-Stream Stability of Fluid Catalytic Cracking (FCC) Gasoline Hydro-Upgrading Catalyst: Post-Treatment of HZSM-5 Zeolite by Combined Steaming and Citric Acid Leaching," Catalysis Today, vol. 125, pp. 185-191, 2007, 11 pages.

Park, Joo-Hyoung et al., "Hydrothermal Stability of CuZSM5 Catalyst in Reducing NO by NH3 for the Urea Selective Catalytic Reduction Process," Journal of Catalysis, vol. 240, pp. 47-57, 2006, 7 pages.

Anonymous, "Reductant Generation for Solid Zeolite SCR/ DPF Catalyst," IPCOM No. 000082821, Published Feb. 28, 2005, 2 pages.

Bonzi, R. et al., "NOx Removal Over a Double-Bed NSR-SCR Reactor Configuration," Catalysis Today, vol. 151, pp. 376-385, 2010, 10 pages.

Chatterjee, Daniel et al., "Modelling of a Combined NOx Storage and NH3-SCR Catalytic System for Diesel Exhaust Gas Aftertreatment," Catalysis Today, vol. 151, pp. 395-409, 2010, 15 pages.

ISA European Patent Office, Search Report of EP11152233.0, Aug. 4, 2011, Germany, 5 pages.

Theis, Joseph et al., "A LNT+SCR System for Treating the NOx Emissions for a Diesel Engine," SAE Technical Paper Series No. 2006-01-0210, 2006 SAE World Congress, Detroit, MI., Apr. 3-6, 2006, 17 pages.

Snow, Rachel et al., "Robustness of a LNT-SCR System to Aging Protocol," SAE Technical Paper Series No. 2007-01-0469, 2007 World Congress, Detroit, MI., Apr. 16-19, 2007, 13 pages.

Hackenberg, Stefan et al., "Ammonia on a LNT: Avoid the Formation or Take Advantage of It," SAE Technical Paper Series No. 2001-01-1239, 2007 World Congress, Detroit, MI., Apr. 16-19, 2007, 11 pages.

Snow, Rachel et al., "Calibration of a LNT-SCR Diesel Aftertreatment System," SAE Technical Paper Series No. 2007-01-1244, 2007 World Congress, Detroit, MI., Apr. 16-19, 2007, 11 pages.

Chimner, Christian, "Transient On-Road Emission Reduction of an LNT+SCR Aftertreatment System," SAE Technical Paper Series No. 2008-01-2641, Commercial Vehicle Engineering Congress & Exhibition, Rosemont, IL., Oct. 7-9, 2008, 14 pages.

Dykes, Erik C., "NOx Performance of an LNT+SCR System Designed to Meet EPA 2010 Emissions: Results of Engine Dyna-

(56) References Cited

OTHER PUBLICATIONS mometer Emissions Tests," SAE Technical Paper Series No. 2008-01-2642, Commercial Vehicle Engineering Congress & Exhibition, Rosemont, IL., Oct. 7-9, 2008, 13 pages.

Xu, Lifeng et al., "Impact of a Cu-zeolite SCR Catalyst on the Performance of a Diesel LNT+SCR System," SAE Technical Paper Series No. 2009-01-0285, Ford Motor Company, 12 pages.

Theis, Joseph R. et al., "The Effects of Sulfur Poisoning and Desulfation Temperature on the NOx Conversion of LNT+SCR Systems for Diesel Applications," SAE Technical Paper Series No. 2010-01-0300, Ford Motor Company, 15 pages.

Simescu, Stefan et al., "A Novel Approach for Diesel NOx/PM Reduction," SAE Technical Paper Series No. 2010-01-0308, Southwest Research Institute, 8 pages.

Chen, Hai-Ying et al., "Advanced Catalysts for Combined (NAC+SCR) Emission Control Systems," SAE Technical Paper Series No. 2010-01-0302, Johnson Matthey Inc., 14 pages.

\* cited by examiner

LNT AND SCR CATALYSTS FOR COMBINED LNT-SCR APPLICATIONS

RELATED APPLICATIONS

The present application claims priority to European Patent Application No. 11152233.0, filed on Jan. 26, 2011, the entire contents of which are hereby incorporated by reference for all purposes.

FIELD

The current invention is related to LNT-catalysts and SCR-catalysts for an exhaust gas treatment system, in particular to be used as an exhaust gas treatment system for a combustion engine.

BACKGROUND AND SUMMARY

Nitrogen oxides ($NO_x$) are major air pollutants contributing to the formation of acid rains and urban smoke with devastating impact on the nature and the health of peoples. Recent environmental EU or North America standards will soon require cleaner vehicles having engines with low emissions of $NO_x$ (Euro 6-Euro 7, US EPA standards MY2007 and later), which could not be achieved without advanced after treatment systems with $NO_x$ reduction catalysts.

Two basic modern methods to reduce $NO_x$ emissions are currently LNT (lean $NO_x$ trap, sometimes called as NSR ($NO_x$ storage-reduction)) and SCR (selective catalytic reduction) with ammonia. Both methods have their advantages and drawbacks.

LNT-catalysts use rich pulses with diesel fuel as a reductant, storing $NO_x$ as nitrates and nitrites on oxides of basic nature like barium oxide under prevailing lean conditions, and reducing stored $NO_x$ during short rich pulses on PGM components. LNT is expensive due to high PGM loading, is vulnerable to sulfur, and requires complex desulfurization procedure; current LNT formulations have narrow a temperature window and limited thermal stability.

SCR-catalysts use ammonia, which can reduce more effectively nitrogen oxides $NO_x$ in a comproportionation reaction within wide temperature range and under different conditions. An SCR-catalyst does not require PGM components and is therefore less expensive. However, the SCR method needs an additional reductant like ammonia, or more commonly urea, which can decompose to ammonia. Hence, the implementation of an SCR-catalyst requires additional infrastructure and equipment to supply vehicles with urea or ammonia, respectively. Typically, Cu/zeolite or Fe/zeolite is a capable SCR catalyst.

Recently, a new approach with combined LNT-SCR appeared, in which the SCR catalyst is installed downstream of the LNT catalyst. Most of the time the system is operated under prevailing lean conditions, enabling economical running of the engine. During this phase, the $NO_x$ emissions are adsorbed by the LNT catalyst. However, short fuel enrichments need to be applied periodically for the LNT regeneration to reduce the stored $NO_x$ Ammonia, which is produced in the LNT as a by-product of the $NO_x$ reduction under controlled fuel-rich conditions is then adsorbed in the $NH_3$—SCR catalyst located downstream. The adsorbed $NH_3$ is consequently utilized in selective $NO_x$ reduction during the next fuel-lean period. The LNT+SCR configuration thus eliminates the need for an external $NH_3$ source (e.g., periodically re-filled urea solution tank) that is necessary in the case of the stand-alone SCR.

Such systems are described as combined LNT-SCR binary catalyst, sometimes also called passive $NH_3$-SCR in U.S. Pat. No. 7,490,464 B2, US 2010/132335 A1, DE 10 2008 043 706 A1, WO 2010/022909 A1, US 2010/050613 A1, US 2010/050604 A1, US 2009/173064 A1, US 2008/282670 A1, US 2008/072575 A1, US 2007/277507 A1, US 2007/271908 A1, US 2007/056268 A1, US 2007/006573 A1, US 2006/010857 A1. Other references in non-patent literature can be found in Laboratory and Vehicle Demonstration of "2nd-Generation" LNT+ in-situ SCR Diesel $NO_x$ Emission Control Systems" Lifeng Xu, Robert McCabe, Mark Dearth and William Ruona, Ford Motor Co., Society of Automotive Engineers, SAE 2010-01-030; "Modeling of a combined $NO_x$ storage and NH3–SCR catalytic system for Diesel exhaust gas after treatment" Chatterjee, Daniel, Koci, Petr, Schmeisser, Volker, Marek, Milos, Weibel, Michel, Krutzsch, Bernd, Daimler AG, Stuttgart, Germany Catalysis Today (2010), 151(3-4), 395-409; "The Effects of Sulphur Poisoning and Desulfation Temperature on the $NO_x$ Conversion of LNT+SCR Systems for Diesel Applications" Joseph R. Theis, Justin A. Ura and Robert W. McCabe, Ford Motor Company, SAE 2010-01-0300; "$NO_x$ removal over a double-bed NSR–SCR reactor configuration" Bonzi, R., Lietti, L., Castoldi, L., Forzatti, P. Dipartimento di Energia, Laboratory of Catalysis and Catalytic Processes and NEMAS, Centre of Excellence, Politecnico di Milano, Milan, Italy. Catalysis Today (2010), 151(3-4), 376-385; "Impact of a Cu-zeolite SCR catalyst on the performance of a diesel LNT+SCR system" Xu, Lifeng; McCabe, Robert; Ruona, William; Cavataio, Giovanni Ford Motor Company, USA. Society of Automotive Engineers, [Special Publication] SP (2009), SP-2254 (Diesel Exhaust Emission Control), 121-132; "$NO_x$ performance of an LNT+SCR system designed to meet EPA 2010 emissions: results of engine dynamometer emission tests." Dykes, Erik C. Eaton Corporation, USA. Society of Automotive Engineers, [Special Publication] SP (2008), SP-2217 (Commercial Vehicle Emissions), 57-67; "Transient on-road emission reduction of an LNT+SCR after treatment system" Chimner, Christian Eaton Corporation, USA Society of Automotive Engineers, [Special Publication] SP (2008), SP-2217 (Commercial Vehicle Emissions), 45-56; "Calibration of a LNT-SCR diesel after treatment system" Snow, Rachel; Cavataio, Giovanni; Dobson, Doug; Montreuil, Cliff; Hammerle, Robert. Ford Motor Company Research and Advanced Engineering, Dearborn, Mich., USA Society of Automotive Engineers, [Special Publication] SP (2007), SP-2080 (Diesel Exhaust Emission Control), 377-385; "Ammonia on a LNT: avoid the formation or take advantage of it." Hackenberg, Stefan; Ranalli, Marco ArvinMeritor Emissions Technologies GmbH, Germany Society of Automotive Engineers, [Special Publication] SP (2007), SP-2080 (Diesel Exhaust Emission Control), 337-345; "Robustness of a LNT-SCR system to aging protocol" Snow, Rachel; Dobson, Doug; Hammerle, Robert; Katare, Santhoji Ford Motor Company Research and Advanced Engineering, Dearborn, Mich., USA Society of Automotive Engineers, [Special Publication] SP (2007), SP-2080 (Diesel Exhaust Emission Control), 127-137; "A LNT+SCR system for treating the $NO_x$ emissions from a diesel engine." Theis, Joseph; Gulari, Erdogan Ford Motor Company, Dearborn, Mich., USA Society of Automotive Engineers, [Special Publication] SP (2006), SP-2022 (Diesel Exhaust), 45-59.

In general, these publications and patent references basically describe the concept of a combined LNT-SCR, typically using commercially available LNT and SCR catalysts, developed for LNT and SCR-alone technologies without their further modification or adaptation for this specific combined LNT+SCR approach. However, current commercial LNT and SCR catalysts are not designed for specific LNT-SCR applications with an SCR catalyst placed downstream of an LNT catalyst. Basic problems are the following: narrow temperature window of $NO_x$ conversion, low efficiency of ammonia production on the LNT catalyst, $NO_x$ slip during transition from the ECE to EUDC part of the NEDC driving cycle, additional CO production on the SCR catalyst as well as the high cost of the LNT catalyst due to high Pt and Rh loading.

H-Y Chen, E. C. Weigert J. M. Fedeyko, J. P. Cox & P. J. Anderson from Johnson Matthey describe in SAE-2010-01-0302 more advanced catalysts for combined LNT-SCR applications. However, further improvement and adjustment of both LNT and SCR catalyst for combined LNT-SCR applications is necessary, authors from Johnson Matthey also claim the lower cost for LNT, but in fact, the cost reduction is quite low due to the PGM loading of 80 g/ft$^3$ Pt, 20 g/ft$^3$ Pd and 20 g/ft$^3$ Rh. This PGM-loading is still very high, especially the Rh loading is enormous, in the meantime Rh is the most expensive PGM component According to this background, the underlying objective of the current invention is to present a combination of catalysts, which can be significantly less expensive. In addition, this combination of specially designed catalysts shall improve the performance when used in a combined LNT-SCR system with the SCR catalyst located downstream of the LNT catalyst.

This objective is solved by a LNT-catalyst for an exhaust gas treatment system, in particular to be used as an exhaust gas treatment system for a combustion engine, comprising a mixed metal oxide having proton-conducting properties, and a mixture of at least two platinum group metals (PGM) on a support, wherein the mixed metal oxide is a lanthanum-cerium-oxide, in which up to 40 mol-% of lanthanum is replaced by calcium and/or strontium, and from 0 to 66 mol-% of cerium can be replaced by zirconium and/or praseodymium and the platinum group metals comprise Pt and Pd or Pt—Pd—Rh combination.

The LNT-catalyst is comprising a mixed metal oxide and a mixture of at least two platinum group metals (PGM) on a support and is especially useful to be installed upstream of a SCR-catalyst. A further object of this invention is directed to the SCR-catalyst containing zeolite for an exhaust gas treatment system, in particular to be used in combination with the before mentioned LNT-catalyst. This invention typically deals with a catalytic system comprising a combined LNT-SCR-catalyst.

The invention basically relates to the abatement of nitrogen oxides ($NO_x$) from combustion exhaust gas streams. The invention relates in particular, to a process for reducing $NO_x$ from oxygen containing exhaust gases from internal combustion engines (ICE), in particular emitted from diesel engines or lean-burn gasoline engines and could be also related to a removing process of $NO_x$ formed by any other combustion processes, such as in stationary engines, in industry, etc.

It has been found that a catalyst of such composition can highly effectively produce ammonia and reduce $NO_x$ while at the same time having a lower PGM-loading compared to those catalysts currently known. Because of these characteristics, such a catalyst is especially useful as a LNT-catalyst upstream of a SCR-catalyst.

According to a preferred embodiment of the LNT-catalyst of this invention, the mixed metal oxide has defect fluorite structure with proton-conducting properties.

It has been found to be advantageous, if up to 66 mol-% of cerium is replaced by zirconium or praseodymium. Such catalysts can provide an even higher ammonia production rate.

Although the LNT-catalysts of this invention also work with higher PGM-loadings, it has been found that the total loading of platinum group metals of 100 g/ft$^3$ or less is sufficient for a highly effective production rate of ammonia in the relevant temperature range of exhaust gases, i.e. from about 150° C. to about 450° C.

According to the preferred embodiment of the LNT-catalyst of this invention, the Pt-loading is 10-70 g/ft$^3$, preferably 25-35 g/ft$^3$.

A further preferred LNT-catalyst according to this invention is characterized by a Pd-loading of 5-40 g/ft$^3$, preferably 10-15 g/ft$^3$.

Another preferred embodiment is Rh-loading up to 10 g/ft$^3$, in particular 2-5 g/ft$^3$ is highly preferred as these loadings provide a good compromise between catalytic activity and costs of the catalyst.

The LNT-catalyst may comprise any suitable support, which is typically used in exhaust gas after treatment systems. Preferably however, the support is selected from cordierite, in particular provided with an alumina wash coat.

The production of LNT-catalyst according to this invention may be carried out by a process method including impregnation of the support with a solution of La, Ce, Ca, Sr, Zr, Pr salts, respectively, in particular with an aqueous solution of the nitrate salts further containing urea; drying and afterwards calcinations at temperature of at least 850° C. for at least 1.5 h, in particular using the drying at 88° C. for about 10 h, then drying at 100° C. and preferably further calcinations at 900° C. for 2 h; impregnation of the modified support with a solution of the platinum group metals precursors, in particular with an aqueous solution of non-chlorine salts of these metals further containing citric acid and urea; drying and afterwards calcinations of the PGM-impregnated support at temperature of at least 550° C. for at least 1.5 h, in particular drying at a 88° C. for about 10 h, then drying at 100° C. and calcinations at 600° C. for 2 h.

Another object of this invention is directed to a SCR-catalyst for an exhaust gas treatment system, in particular to be used in combination with an LNT-catalyst according to this invention for selective catalytic reduction of nitrogen oxides with ammonia in an exhaust gas treatment system for a combustion engine, the SCR-catalyst being prepared by a method including modifying a zeolite containing support by essential removal of aluminum extra-lattice/extra-framework species from the zeolite; calcinations of the modified support at a temperature of at least 550° C., in particular at 600° C.; and insertion of Cu, Cu/Ce, Mn/Ce or Co/Ce into the modified zeolite by ion-exchange and/or impregnation.

It has been found that such SCR-catalyst is highly effective in combination with the LNT-catalyst of this invention because the catalytic activity of such an SCR-catalyst in terms of $NO_x$-conversion with ammonia is very high in the same temperature window, in which the LNT-catalyst of this invention has its peak effectiveness for ammonia production. Accordingly, these catalysts are connected to each other by having the same optimal operating conditions in an exhaust gas after treatment system.

Preferably, the support of such an SCR-catalyst is a Cu/zeolite including a commercial Cu/zeolite catalyst on cordierite or another support, whereas the removal step mentioned above comprises essential removal of copper and aluminum extra-lattice/extra-framework species from the commercial zeolite.

According to a further embodiment of the SCR-catalyst according this invention, the removal of Cu and/or Al is carried out with a citrate-containing solution, in particular comprising citric acid and diammonium hydrogen citrate, whereas the removal and calcination steps are repeated at least once.

For the SCR-catalyst it is even more preferred, if the first step is performed at a temperature of 80-100° C., preferably of about 97° C.

The SCR-catalyst of this invention may further be characterized in that the insertion step is carried out in the presence of urea, in particular using an aqueous solution with nitrate salts of Cu, Ce, Mn and Co, respectively.

A highly preferred SCR-catalyst of the current invention is characterized in that the insertion step is followed by drying for a period of at least 6 hours, in particular at a temperature of about 88° C., and calcinations at a temperature of at least 550° C., preferably at about 600° C.

The SCR-catalyst of this invention may be deposited on any suitable support, which is typically used in exhaust gas after treatment systems. Preferably however, the support is cordierite, in particular provided with a zeolite washcoat.

Another object of this invention is a catalyst system for an exhaust gas treatment system, in particular to be used as an exhaust gas treatment system for a combustion engine, comprising an LNT-catalyst of this invention and an SCR-catalyst, wherein the SCR-catalyst is positioned downstream of the LNT-catalyst. According to this embodiment, any commercially available SCR-catalyst can be combined with the LNT-catalysts of this invention. It is however preferred, if the SCR-catalyst is an SCR-catalyst of this invention. The reason for this is that both catalysts of this invention work together very well due to their similar catalytic activity profile over the relevant temperature range from 150° C. to 450° C. Further, the SCR catalyst of this invention has additional advantages relative to common SCR Cu/zeolite catalyst for stand-alone SCR applications, namely higher ammonia storage capacity, better $NO_x$ reduction with CO and HC presented in Diesel exhaust, Ce-containing SCR catalysts of invention have also additional $NO_x$ storage and better CO oxidation properties than common Cu/zeolite SCR catalyst. These features of new developed LNT and SCR catalysts provide more effective $NO_x$ emissions reduction for combined LNT-SCR applications and offer more cost effective solution for lean $NO_x$ Diesel after treatment.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

In the following, the invention is presented in part with preferred embodiments and FIGS. 1 to 11 in more detail. The figures show:

DETAILED DESCRIPTION

Figure 1:
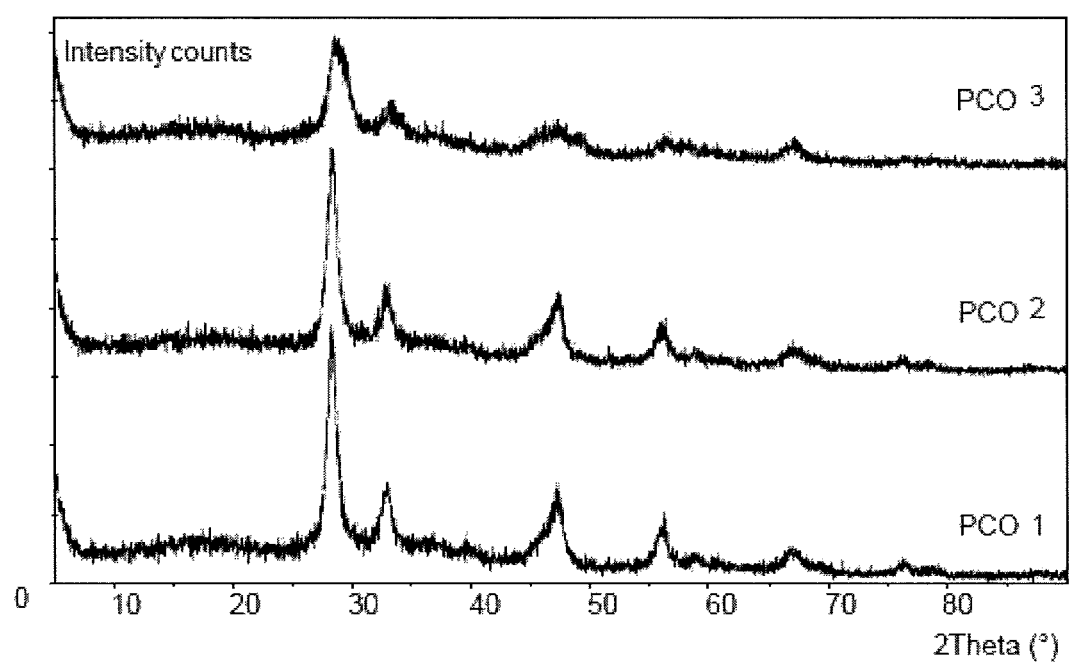
FIG. 1: XRD data of proton conducting oxides (PCO) on alumina, prepared according to examples 1. PCO1—Ex. 1a, Ca—La—Ce mixed oxide, PCO 2—Ex.1b, Sr—La—Ce mixed oxide, PCO 3—Ex. 1c, Sr—La—Ce—Zr mixed oxide.

The LNT catalyst has significantly lower PGM loading, for example typical loading was 30 Pt 15 Pd 5 Rh (g/ft$^3$), while has comparable and better activity relative to commercial LNTs having 85-100 Pt/4-20 Pd/8-10 Rh. The LNT-catalysts of this invention represent a combination of these Pt, Pd and if desired further Platinum group metals (PGM), especially Rh with proton conductors of Sr (Ca)—La—Ce (Zr, Pr) mixed oxide. This combination can provide better ammonia production during rich pulses regarding commercial LNTs and comparable or better $NO_x$ reduction activity despite of very low PGM loading.

The SCR-catalysts of this invention can be prepared by citrate treatment of commercial Cu/zeolite catalyst with the following deposition (reinsertion) of Cu or Cu—Ce, Mn—Ce or Co—Ce catalyst. These catalysts contain less or no copper. Their advantages are better ammonia storage at high temperatures, better own $NO_x$ reduction activity with CO and HC which are reductants for rich pulses and are available in Diesel exhaust even under lean conditions, better CO oxidation properties relative to commercial Cu/zeolite SCR catalyst, additional $NO_x$ storage on SCR catalyst (last property for ceria-containing SCRs), while having close or better $NO_x$ conversion under SCR—$NH_3$ conditions.

Both improvements in LNT and SCR allow the creation of a high-performance combined LNT-SCR application with high $NO_x$ conversion and significantly lower $NO_x$ slip for transient ECE to EUDC simulation conditions. This invention also offers low-cost solution for Diesel engine after treatment systems. The advantages and additional novelties for catalyst systems are also involved in the following parts of this invention and in the appended claims.

Testing Conditions
LNT Testing and Combined LNT-SCR Testing

All catalysts were tested in a laboratory-scale packed-bed flow reactor made from a 1" ID×4" L quartz tube. An electric furnace was used for the heating of the reactor. A core catalyst sample 1" ID×1.5" L was inserted into quartz tube wrapped with matting material together with two thermocouples inserted 5 mm right before and behind core sample.

A conventional flow setup was used for gas mixture preparation. All gases were of ultra high purity. A humidifier was installed to provide precise water concentration in the gas line. The flow rates were controlled using mass flow controllers (MKS, Munich, Germany). To prevent water condensation, all connection lines were installed in a thermal box maintaining constant temperature of 85° C. Reactor effluents were analyzed with a HP 6890A gas chromatograph, using Porapak Q and NaX capillary columns. FTIR analyzer (MKS Company, Munich) was used for continuous NO, $NO_2$, $NH_3$ and other effluent measurement.

Lean/Rich (L/R) Alternate Conditions:

A core sample was placed into the reactor and was exposed to lean reaction mixture for 60 s and then lean mixture was completely exchanged for rich mixture for 10 s; then such a cycle was repeated many times until the steady-state $NO_x$ conversion was obtained at different temperatures, typically within 30-40 minutes. $NO_x$ conversion was calculated as an integral difference between inlet and outlet $NO_x$ concentrations for last 10 cycles upon reaching the state-state $NO_x$ conversion. Both mixtures were supplied using separate lines equipped with mass-flow controllers and mixtures were alternated automatically by 6-way valves rotating using computer software.

Reaction conditions were the following:

SV=10000 $h^{-1}$, feed flow rate 3.3 l/min Lean conditions: NO 750 ppm, $O_2$—10.0%, $CO_2$—5.0%, $H_2O$—5.0%, $N_2$—balance t=1 min Rich conditions: $C_3H_6$—0.33%, CO—2.0%, $O_2$—0.5%, $CO_2$—5.0%, $H_2O$—5.0%, $N_2$—balance t=10 sec. The typical $NO_x$ profiles for such alternating rich/lean conditions are presented in FIG. 7-9.

$NH_3$-SCR Testing

All catalysts were tested in the laboratory-scale fixed-bed flow reactor made from a quartz tube.

A core catalyst sample of ¾" D×1" L was inserted into quartz tube wrapped with a matting material. The cores were equipped with two thermocouples inserted directly before and behind the core sample. A humidifier was installed to provide precise water concentration in the gas line. The flow rates were controlled using mass flow controllers (MKS, Munich, Germany). To prevent water and product condensation, all connection lines were heated up to approximately 170° C. Reactor effluents were analyzed with Twin Chemical Ionization MS from MS4, Austria.

The concentration of $NO_x$ in the gas mixture for SCR separate testing was 500 ppm, $NH_3$ 600 ppm, $O_2$ 10 vol. %, and $H_2O$ 10%, and nitrogen as a balance gas. Typically 500 ppm NO represented $NO_x$ for experiments. The total flows were set to obtain SV=30000 $h^{-1}$. Ammonia storage capacity was measured as an amount of $NO_x$ reacted with adsorbed ammonia. To determine this amount, the ammonia supply was switched off after reaching the steady-state $NO_x$ and adsorbed ammonia was titrated by $NO_x$ under stoichiometric reaction with $NO_x$ at each temperature within 150-400° C. temperature range. The amount of ammonia adsorbed was calculated as follow: NH3_ads=NH3_in−($NO_x$_in−$NO_x$_out)−NH3_out, where "in" and "out" is inlet and outlet concentrations of $NO_x$ and ammonia accordingly.

$NO_x$ Adsorption-Desorption Properties Evaluation

To study $NO_x$ adsorption properties of SCR catalysts, the cores were exposed to lean reaction mixture: NO 750 ppm, $O_2$—10.0%, $CO_2$—5.0%, $H_2O$—5.0%, $N_2$—balance at definite temperature, then NO feed was switched off and temperature was raised until complete desorption of adsorbed $NO_x$ species.

Combined LNT-SCR Testing Under Lean-Rich Conditions

For combined LNT-SCR testing, the core with SCR catalyst was placed downstream of core SCR with 5 mm gap. Both cores had the same size 1" ID×1.5" L. Lean/rich cycling was carried out under the same conditions as for LNT-single core testing using the same feed flow rate.

$NO_x$ Breakthrough Simulation for Transition from ECE to EUDC Part of NEDC

LNT+SCR cores were first exposed to Lean-Rich (L/R) alternating cycling at T=175° C. for 1 h, then the last lean period was carried out without rich pulse, and NO feed was switched off and temperature simultaneously started to increase (temperature-programmed desorption), with maximal possible ramp 20° C. per minute. Released $NO_x$ was measured by FTIR and the amount released was evaluated in mmol $NO_x$/per core.

$NO_x$ Reduction by SCR Catalysts Under Lean Conditions

SCR cores were exposed to the reaction mixture: NO—200 ppm, C3=–250 ppm, CO—1250 ppm, CO2—5.0%, H2O—5.0%, O2—10%, $N_2$—balance. This mixture is simulating Diesel exhaust under lean cold-start conditions. Passive $NO_x$ reduction was measured at different temperatures with temperature steps of 25-50° C.

Catalyst Preparation and Reference Samples:

The preparation process for the individual samples was as follows:

The core samples 1" ID×1.5" L for LNT were drilled from a brick containing cordierite monolith having a cell density of 400 cpsi (='cells per square inch') with a ca. 30 wt % of washcoated alumina. These core samples were further impregnated with active LNT components and calcined as described below. The core samples for SCR (zeolite-based) were prepared from commercial SCR brick, 400 psi (company A) by special treatment, as it will be described below. The core size was ¾" ID×1" L for testing under $NH_3$—SCR conditions and 1" ID×1.5" L for testing for combined LNT-SCR under Lean-Rich (L/R) alternating cycles and $NO_x$-breakthrough ECE to EUDC transition simulations.

Preparation of LNT Samples

Example 1a

Invention—Pt—Pd—Rh/Ca—La—Ce Mixed Oxide 0.41 g of lanthanum nitrate La $(NO_3)_3.6H_2O$, 0.012 g of calcium nitrate Ca $(NO_3)_2$. $4H_2O$, 0.44 g of cerium (III) nitrate Ce $(NO_3)_3.6H_2O$ and 0.90 g of urea were dissolved in 2.7 ml of distilled water and the core sample was then impregnated with this solution and dried at 88° C. overnight and finally dried at 100° C. and calcined at 900° C. for 2 hours to form La—Ca—Ce mixed oxide on the surface of alumina-washcoated cordierite.

The core sample was further treated with a solution containing 0.23 g of tetra-amineplatinum (II) hydroxide solution (9.09 wt. % Pt), 0.22 g of tetra-amminepalladium nitrate solution (4.6 wt. % Pd), 27 mg of Rh nitrate (12.9% Rh), 0.38 g of citric acid and 0.90 g of urea and 2.25 g of distilled water. PGM loading was the following—Pt 30 $g/ft^3$, Pd 15 $g/ft^3$, Rh 5 $g/ft^3$. The core was further dried at 88° C. overnight and finally dried at 100° C. and finally calcined at 600° C. for 2 hours.

Example 1b

Invention—Pt—Pd—Rh/Sr—La—Ce Mixed Oxide

The method of preparation and chemicals used were the same as described in Example 1a, but 0.011 g of strontium nitrate $Sr(NO_3)_2$ was used instead of calcium nitrate.

Example 1c

Invention—Pt—Pd—Rh/Ca—La—Ce—Zr Mixed Oxide

The method of preparation was the same as it described in Example 1a, but 0.22 g of cerium nitrate and 0.34 g of zirconyl nitrate, 35% solution in diluted nitric acid was used instead of 0.44 g of cerium nitrate as in Example 1a.

Example 1d

Invention—Pt—Pd/Ca—La—Ce Mixed Oxide (Pt and Pd Higher Loading, Rh-free)

The method of preparation and chemicals were the same as described for Example 1a, but 0.46 g of tetra-ammineplatinum (II) hydroxide solution (9.09 wt. % Pt), and 0.45 g of tetra-amminepalladium (II) ammonium nitrate (4.6 wt. % Pd) were used (double amount), the amount of distilled water was adjusted to 1.75 ml. PGM loading was the following: Pt 60 $g/ft^3$, Pd 30 $g/ft^3$, Rh 0 $g/ft^3$.

Example 1e

Invention—Pt—Pd—Rh/Sr—La—Ce—Pr Mixed Oxide 0.30 g of lanthanum nitrate $La(NO_3)_3.6H_2O$, 0.013 g of praseodymium nitrate $Pr(NO_3)_3.6H_2O$ and 0.44 g of cerium (III) nitrate $Ce(NO_3)_3.6H_2O$ and 0.98 g of urea were dissolved in 2.7 ml of distilled water and the core sample was then impregnated with this solution and dried at 88° C. overnight and was finally dried at 100° C. and calcined at 900° C. for 2 hours to form Sr—La—Ce mixed oxide on the surface of alumina-washcoated cordierite.

The core sample was further treated with a solution containing 0.23 g of tetra-ammineplatinum (II) hydroxide solution (9.09 wt. % Pt), 0.23 g of tetra-amminepalladium nitrate solution (4.6 wt. % Pd), 27 mg of Rh nitrate (12.9% Rh), 0.38 g of citric acid, 0.90 g of urea and 2.25 g of distilled water. PGM loading was the following—Pt 30 $g/ft^3$, Pd 15 $g/ft^3$, Rh 5 $g/ft^3$. The core was further dried at 88° C. overnight and finally dried at 100° C. and finally calcined at 600° C. for 2 hours.

Preparation of SCR Samples

Example 2a

Invention, Cu/Modified Zeolite A

Core samples were drilled and cut from monolithic substrate brick of commercial Cu/zeolite, Company A. The samples were further treated with 1 L solution of 0.15M of citric acid and 0.4 M of diammonium hydrogen citrate for 2 hours at 97° C. and thoroughly washed with distilled water. After drying at 100° C. the cores were then calcined at 600° C. for 2 h. The cores were treated further the second time under the same conditions with the same solution containing citric acid and its diammonium hydrogen salt, washed with distilled water using a big excess of water and were further dried at 100° C. and calcined at 400° C. These core samples were further ion-exchanged using 0.1M solution of copper nitrate at 97° C. for 2 h and dried at 100° C. Finally, the cores were calcined at 600° C. for 1 h and then under hydrothermal conditions in 10% $O_2$, 10% $H_2O$, balance $N_2$ mixture at 600° C. for 1 h.

Example 2b

Invention, Cu—Ce/Modified Zeolite A

The core was prepared according to Example 1, including the ion-exchange with copper nitrate under the same conditions. The samples were further dried at 100° C. and calcined at 400° C. with the following impregnation using solution of cerium nitrate (1.57 g in 3.5 g of distilled water in the presence of 1.25 g of urea). The samples were dried at 88° C. overnight and finally calcined at 600° C. for 1 h and then under hydrothermal conditions in 10% $O_2$, 10% $H_2O$, balance $N_2$—mixture at 600° C. for 1 h.

Example 2c

Invention, Mn—Ce/Modified Zeolite A

The cores were prepared according to Example 1, but without ion-exchange with copper nitrate. Instead of it, the cores were impregnated with a solution of 0.755 g of manganese (II) nitrate Mn $(NO_3)_2.4H_2O$ and 1.55 g of cerium nitrate, urea 1.68 g and 3.5 g of distilled water. The samples were dried at 88° C. overnight and finally calcined at 600° C. for 1 h and further under hydrothermal conditions in 10% $O_2$, 10% $H_2O$, balance $N_2$ mixture at 600° C. for 1 h.

Example 2d

Invention, Modified Co—Ce/Zeolite

The cores were prepared according to Example 1, but without ion-exchange with copper nitrate. Instead of it, the cores were impregnated with a solution of 0.415 g of cobalt (II) nitrate $Co(NO_3)_2.6H_2O$ and 1.45 g of cerium nitrate, urea 1.68 g and 3.5 g of distilled water. The samples were dried at 88° C. overnight and finally calcined at 600° C. for 1 h and further under hydrothermal conditions in 10% $O_2$, 10% $H_2O$, balance $N_2$ mixture at 600° C. for 1 h.

Reference Samples:

Commercially available LNT prototypes and SCR prototypes from 3 different companies have been used as references for comparison purposes. For cores preparation, the cores were drilled from washcoated monolithic substrates containing washcoated LNTs on alumina or washcoated with SCR catalysts containing zeolites. The cores size was selected as 1 inch in diameter and 1.5 inch in length for core samples, 3 pairs of LNT-SCR cores were tested from each company:

Company A: LNT A (Pt-100 Pd-0Rh-10) and SCR company A-Cu/zeolite A

Company B: LNT B (Pt-108 Pd-4Rh-8) and SCR company B-Cu/zeolite B

Company C: LNT C (Pt-100 Pd-20Rh-10) and SCR company C-Cu/zeolite C

LNT Catalyst Development for LNT-SCR Applications

The currently commercially available LNT and SCR catalysts are not designed for combined LNT-SCR applications. Commercial LNT catalysts produce a little or no ammonia during reasonable (short) rich pulses, while long rich pulses leads to high fuel penalty, additional CO and HC emissions and dangerous motor oil dilution. The basic problems for high ammonia production on LNT is the presence of oxygen storage material such as cerium dioxide (ceria), which can release oxygen during rich pulses thus oxidizing ammonia and preventing its production by oxidizing the reductants, primarily hydrocarbons and CO and also hydrogen produced which are necessary to produce ammonia.

Severely aged commercial LNTs can produce more ammonia, but the performance of LNT itself decreases drastically after aging and higher ammonia production cannot compensate the low performance of LNT itself to reduce nitrogen oxides ($NO_x$). The cost of LNT is also very high due to the high loading of costly platinum group metals, basically Pt—Rh binary or Pt—Pd—Rh containing ternary compositions is now in service for LNT. For LNTs, PGM components are usually combined with oxides having very strong basic nature like alkalis, but typically barium oxide. Oxide having oxygen storage capacity, namely ceria is also typical for LNT formulations. Currently, typical LNT formulations are now Pt—Pd—Rh/Ba—Ce oxides deposited on alumina washcoated monolithic substrate, commonly on cordierite monoliths.

H-Y Chen, E. C. Weigert, J. M. Fedeyko, J. P. Cox & P. J. Anderson from Johnson Matthey described in their SAE paper "Advanced catalysts for combined NAC-SCR emission control systems" SAE-2010-01-0302, more advanced catalysts for combined LNT-SCR applications. They increased ammonia production from LNT by decreasing ceria (oxygen storage component) and decreased the cost of LNT by replacing part of Pt with Pd keeping the same PGM loading. However, both approaches of JM are very limited. Ceria function is to increase low-temperature activity of LNT. Both decrease of ceria loading and PGM loading, especially of Pt and costly Rh leads to low performance at low temperatures below T=250-300° C., and increase of ammonia production cannot compensate the lowering of activity of LNT itself. In addition, the total decrease of cost due to Pt substitution (they changed composition from 100Pt:0Pd:20Rh to 80Pt:20Pd:20Rh) is quite limited. The authors also used very high loading of Rh, the most expensive PGM component, meantime current Rh loading in LNT is typically 10 g/ft$^3$.

Therefore, the further improvement and adjustment of both LNT and SCR catalyst for combined LNT-SCR applications is necessary. The current approach of this invention to improve LNT designed for combined LNR-SCR is based on using of proton-conducting oxides. The idea was that such oxides can facilitate ammonia production, because proton transfer is one of the key factors for ammonia production. Such proton-conducting ceramic of fluorite and/or pyrochlore structure was described in Ji-De Wang, Ya-Hong Xie, Zheng-Fang Zhang, Rui-Quan Liu and Zhi-Jie Li. Protonic conduction in Ca2+-doped La2M2O7 (M=Ce, Zr) with its application to ammonia synthesis electrochemically, Materials Research Bulletin, Volume 40, Issue 8, August 2005, Pages 1294-1302.

Currently, calcium or strontium substituted $La_2Ce_2O_7$ and $La_2CeZrO_7$ compounds with fluorite structure have been prepared and deposited on alumina-washcoated cordierite, as described above in Examples 1. The mixed oxides like partially Ca-substituted $La_2Ce_2O_7$ were further calcined at 900° C. to provide the formation of proton-conducting ceramic. Such calcinations can also secure the high thermal stability of the catalyst, as it is difficult to expect any further sintering of mixed oxide after such high-temperature calcinations. XRD data of prepared mixed oxides on alumina confirm the formation of defect fluorite structure, as shown in FIG. 1. The zirconia-containing sample, Ex.1c probably contains the minor amount of pyrochlore solid solution.

Figure 2:
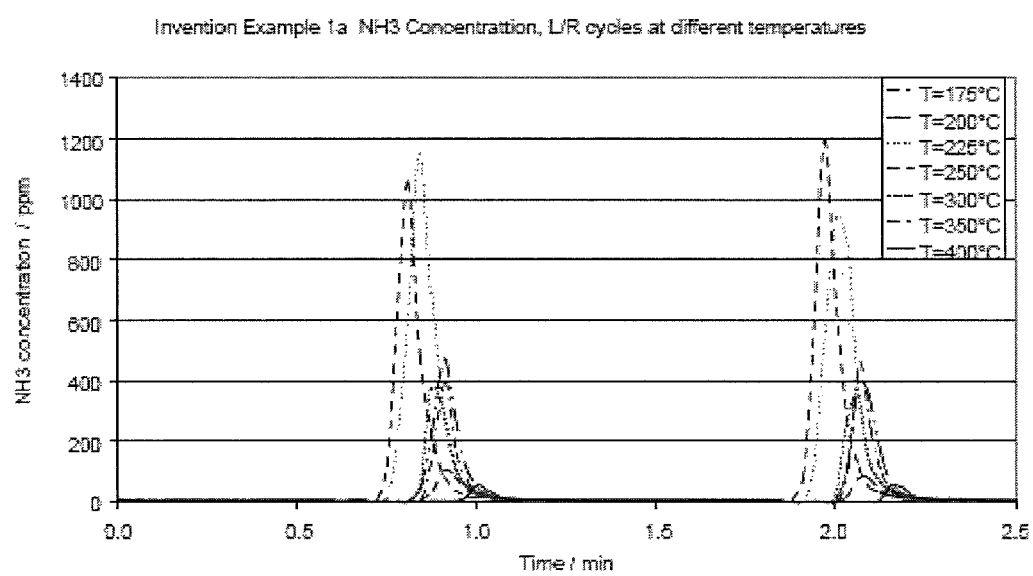
FIG. 2: Typical profile of produced ammonia (ppm) during lean-Rich (L/R) cycles over LNT of the current invention, Example 1a. PGM loading: Pt—30 Pd—15 Rh—5 g/ft$^3$, Ca—La—Ce mixed oxide. Reaction conditions: SV=10000 h$^{-1}$, feed flow rate 3.3 l/min Lean conditions: NO 750 ppm, $O_2$—10.0%, $CO_2$—5.0%, $H_2O$—5.0%, $N_2$—balance t=1 min. Rich conditions: $C_3H_6$—0.33%, CO—2.0%, $O_2$—0.5%, $CO_2$—5.0%, $H_2O$—5.0%, $N_2$—balance, t=10 sec.

Typical PGM components for LNT were then added and catalysts thus obtain were evaluated using alternating lean-rich (L/R) cycles, which are typical for LNT and combined LNT-SCR mode of operations. It was actually found a high ammonia production for Ca and Sr-partially substituted $La_2Ce_2O_7$ fluorites. Such formulations contains a big amount of ceria, the same component, which is detrimental for ammonia production on commercial LNTs, nevertheless, they can produce effectively ammonia, as it shown in FIG. 2 and in Table 1. Ca-substituted La—Ce fluorite was more active than Sr-substituted fluorite in ammonia production at low temperatures below 250° C., but the Sr-substituted catalyst was more effective in ammonia production at higher temperatures. Ba and Mg-substituted $La_2Ce_2O_7$ were found to be significantly less active in ammonia production.

Unlike this new LNT type of the current invention, current commercial prototypes from 3 different companies A, B and C do practically not produce ammonia $NH_3$ under the same L/R cycles, as one can see in Table 1:

TABLE 1

Maximal $NH_3$ production (in ppm) during rich pulses in L/R cycles for LNTs of the current invention and reference commercial LNTs. Lean conditions: NO—750 ppm, $O_2$—9.6%, $CO_2$—5%, $H_2O$—5%, $N_2$—balance t = 1 min. Rich conditions: $C_3H_6$—0.33%, CO—2%, $O_2$—0.5% $CO_2$—5%, $H_2O$—5%, $N_2$—bal t = 10 s; SV = 10 000 $h^{-1}$. Pt, Pd and Rh loading is given in $g/ft^3$.

| Catalyst | T = 175° C. | T = 200° C. | T = 225° C. | T = 250° C. | T = 300° C. | T = 350° C. $X_{NO}$ % | T = 400° C. $X_{NO}$ % |
|---|---|---|---|---|---|---|---|
| LNT company A Pt-100 Pd-0-Rh-10 | 0 | 0 | 0 | 0 | 0 | 0 | 0 |
| LNT company A aged 750 C. 5 h | 0 | 0 | 0 | 7 | 80 | 0 | 0 |
| LNT company B Pt-108 Pd-4 Rh-8 | 0 | 0 | 0 | 5 | 0 | 0 | 0 |
| LNT company B aged 750 C. 5 h | 5 | 40 | 100 | 400 | 45 | 25 | 15 |
| LNT company C Pt-100 Pd-20 Rh-10 | 0 | 0 | 0 | 5 | 5 | 0 | 0 |
| LNT company C aged 750 C. 5 h | 0 | 5 | 10 | 75 | 420 | 0 | 0 |
| LNT Invention, Ex. 1a Ca—La—Ce mixed oxide Pt-30 Pd-15 Rh-5 | 110 | 485 | 1050 | 1145 | 450 | 420 | 55 |
| LNT Invention, Ex. 1b Sr—La—Ce mixed oxide Pt-30 Pd-15 Rh-5 | 45 | 150 | 885 | 1200 | 1300 | 650 | 260 |
| LNT Invention, Ex. 1b Ca—La—Ce—Zr mixed oxide Pt-30 Pd-15 Rh-5 | 140 | 525 | 1020 | 1300 | 500 | 160 | 40 |
| LNT Invention, Ex. 1d Ca—La—Ce— mixed oxide Pt-60 Pd-30 Rh-0 | 20 | 200 | 220 | 280 | 120 | 40 | 10 |
| LNT invention, Ex. 1e Sr—La—Ce—Pr mixed oxide, Pt-30 Pd-15 Rh5 | 220 | 800 | 775 | 485 | 270 | 140 | 10 |

Commercial LNTs revealed after severe aging at 750° C. for 5 h better ammonia production during rich pulses, but it was still significantly lower relative to the LNTs of this invention. The LNT activity of aged commercial LNT meantime dropped significantly after such a severe treatment, $NO_x$ conversion at 200° C. was only 21-24% and 27-57% at 250° C., one can compare this performance with activity of fresh (de-greened at T=600° C.) LNT reference catalysts from different companies in Table 2.

The new type of LNT catalysts of this invention, based on proton-conducting oxides, can effectively produce ammonia despite of high ceria loading, as shown in Table 1. However, the most amazing and unexpected property of such LNTs is their high activity and performance in $NO_x$ reduction using very low PGM loading.

As it presented in Table 2, the $NO_x$ reduction properties of Pt—Pd—Rh on Ca (Sr)— partially substituted $La_2Ce_2O_7$ are very close to the performance of commercial LNTs at low temperatures up to 250° C. and $NO_x$ reduction is better at higher temperatures up to 400° C. Generally, good low-temperature LNT activity requires high platinum (Pt) loading to oxidize NO to $NO_2$ under lean conditions and to effectively reduce stored $NO_x$ under rich conditions, meantime rhodium Rh can increase low-temperature performance reducing $NO_x$ under lean conditions. What is why current LNTs require high Pt loading and costly Rh. Less costly Pd can substitute part of platinum, but high Pd-containing LNTs have low performance.

In addition, Pd is not active in NO oxidation at low temperatures. Typically, commercial prototypes with Pt loading below 70 g/ft$^3$ and low Rh loading have low activity and limited $NO_x$ reduction at low temperatures below 250° C., so the good activity of LNT catalysts of this invention at these temperatures is surprising. The reason of it is not completely clear at the moment, but probably good ammonia production and proton transfer plays the role, because ammonia is more selective and better reductant in comparison with CO and hydrocarbons HC (here propylene), which are reductant for LNT under rich conditions.

At higher Pt loadings, the LNTs of this invention became superior regarding commercial LNTs at low temperatures below 250° C., providing unusually high $NO_x$ reduction at these temperatures, as one can in Table 2, Ex. 1d. LNT can work effectively without Rh with higher Pt and Pd loading. However, the performance at T=400° C. decreased due to too high rate of reductant (CO and HC) oxidation Ammonia generation was also less effective, that points on Rh to produce more ammonia. For formulations of the invention, up to 66% of cerium can be replaced with zirconium, as shown in Table 1 and Table 2 Example 1c, however complete cerium replacement by zirconium leads to low activity. Zirconium-containing samples are more active in ammonia generation at low temperatures, but less active than cerium-only samples at higher temperatures above 300° C.

The partial substitution of cerium to praseodymium in mixed oxide formulation was also beneficial, providing the best $NO_x$ conversion at low PGM loading among all formulations, as shown in Table 2, Example 1e. However, the high degree of substitution to praseodymium, namely more than 60% lead to negative effect.

Summarizing this section, the LNT catalysts of the current invention can provide similar and better performance than current commercial LNTs at lower PGM loading and can provide better low-temperature performance at higher PGM loading, which is still significantly lower relative to PGM loading of commercial LNTs. Good LNT performance is accompanied by high ammonia production despite of high cerium loading, meantime commercial LNTs are not active in ammonia production during rich pulses. The high ammonia production can be used for integrated LNT-SCR applications with SCR catalyst located downstream of LNT catalyst, as it will be shown below in section "Combined LNT-SCR".

TABLE 2

Performance of commercial LNT catalysts and LNT of the invention under alternating Lean/Rich (L/R) cycles; Lean conditions: NO—750 ppm, $O_2$—9.6%, $CO_2$—5%, $H_2O$—5%, $N_2$—bal t = 1 min. Rich conditions: $C_3H_6$—0.33%, CO—2%, $O_2$—0.5% $CO_2$—5%, $H_2O$—5%, $N_2$—bal t = 10 s. All LNT catalysts were calcined at T = 600° C. for 2 h. SV = 10 000 h$^1$

| Catalyst | T = 175° C. $X_{NO}$ % | T = 200° C. $X_{NO}$ % | T = 225° C. $X_{NO}$ % | T = 250° C. $X_{NO}$ % | T = 300° C. $X_{NO}$ % | T = 350° C. $X_{NO}$ % | T = 400° C. $X_{NO}$ % |
|---|---|---|---|---|---|---|---|
| LNT company A Pt-100 Pd-0-Rh-10 | 25 | 44 | 66 | 80 | 93 | 90 | 79 |
| LNT company B Pt-108 Pd-4 Rh-8 | 31 | 36 | 63 | 85 | 92 | 88 | 82 |
| LNT company C Pt-100 Pd-20 Rh-10 | 29 | 38 | 62 | 86 | 96 | 92 | 87 |
| LNT Invention, Ex. 1a Ca—La—Ce mixed oxide Pt-30 Pd-15 Rh-5 | 30 | 39 | 68 | 86 | 96 | 96 | 90 |
| LNT Invention, Ex. 1b Sr—La—Ce mixed oxide Pt-30 Pd-15 Rh-5 | 19 | 42 | 74 | 82 | 97 | 95 | 92 |
| LNT Invention, Ex. 1c Ca—La—Ce—Zr mixed oxide Pt-30 Pd-15 Rh-5 | 35 | 44 | 70 | 85 | 95 | 91 | 84 |
| LNT Invention, Ex. 1d Ca—La—Ce— mixed oxide Pt-60 Pd-30 Rh-0 | 40 | 71 | 81 | 92 | 93 | 87 | 70 |
| LNT invention, Ex. 1e Sr—La—Ce—Pr mixed oxide, Pt-30 Pd-15 Rh 5 | 39 | 56 | 77 | 87 | 93 | 93 | 82 |

SCR Catalyst Development for LNT-SCR Applications

Y Chen, E. C. Weigert, J. M. Fedeyko, J. P. Cox & P. J. Anderson from Johnson Matthey described in their SAE paper SAE-2010-01-0302 more advanced SCR catalysts for combined LNT-SCR applications. However, their improvement was only the use of more thermally stable zeolite to withstand rich pulses, but they still used typical Cu/zeolite or Fe/zeolite formulations, which are not really designed for combined LNT-SCR applications. As an example, for SCR catalyst in such an application, it is highly desirable to have increased ammonia storage, especially at high temperatures, because ammonia, which cannot be stored on SCR catalyst, will be released to environment and will create the ammonia smell. This ammonia cannot react with $NO_x$ released from LNT accordingly and will be lost for $NO_x$ reduction. High-temperature ammonia storage is especially important, because such SCR catalyst will not release ammonia at quick temperature raisings and it will always have ammonia, even at high temperatures, to be available for reaction with $NO_x$ released from LNT.

It has been found that this high-temperature ammonia storage is most critical for the transition from low-speed ECE (city driving) part to EUDC (extra-urban part of cycle) during NEDC (European driving cycle). LNT catalyst can store a significant amount of adsorbed $NO_x$ during ECE low-speed and low-temperature part of cycle, and LNT catalyst release practically all stored $NO_x$ in the beginning of transition to EUDC accompanied with quick temperature increase from 175-200° C. to 325-350° C. under high flow rate conditions. It leads to major part of $NO_x$ emissions released during NEDC cycle for combined LNT-SCR applications.

Two reasons are responsible for this disadvantage/drawback of formulations known so far. First, current commercial LNT catalysts cannot produce enough ammonia to feed SCR catalyst downstream during ECE, and secondly, current SCR Cu/zeolite or Fe/zeolite catalysts have low $NH_3$ ammonia storage at temperatures above 200° C., that leads to release of stored ammonia at temperatures above 200° C. without reaction with $NO_x$.

Generally, $H^+$ (protonic) forms of highly-siliceous zeolites like chabazite, Y or ZSM-5 have strong enough acidic sites with strong ammonia adsorption up to 350° C. and higher, however/for current formulations Cu/zeolite and Fe/zeolite, these acidic centers occupied by copper or iron ions, which decreases ammonia adsorption and ammonia is releasing basically at 150-200° C. on such weak adsorption sites like existing on $Cu^{2+}$-zeolite.

The new type of SCR catalyst has already been developed and described in EP09172402.1. These modified Cu-zeolite catalysts were obtained by treatment with citrate-containing solution of commercial Cu/zeolite SCR catalysts. Such a treatment leads to the removal of commercial Cu coating, but what are the most important, leads to the removal of extra-lattice Al species. These extra-lattice Al species come from defect areas of zeolite structure, amorphous impurities, but basically from zeolite structure where it is enriched by aluminum, especially containing Al—O—Al sites. The next steps are intermediate calcinations at T=600° C. and second treatment with citrate-containing solution, as it described in Example 2a.

The reason of intermediate calcinations is to de-aluminate partially zeolite with formation of extra-lattice Al species basically from Al—O—Al weak acidic sites and to re-distribute the remaining copper species to facilitate their removal, it is impossible to remove all copper ions by one citrate treatment. Then, the acid treatment was repeated again to remove extra-lattice aluminum and remaining copper. The resulting modified zeolite, which was now free from copper and extra-lattice aluminum species, was finally ion-exchanged with copper by standard ion-exchange using the solution of copper nitrate. The copper was re-inserted to zeolite, but zeolite was now modified due to the removal of extra-lattice aluminum. Typically, ion exchange can be described as following by replacing acid sites containing protons on other ion which are in excess in ion-exchange solution, for example Cu. Such Brönsted proton-containing acid sites are forming in zeolite as the result of substitution of tetravalent Si in zeolite framework with trivalent aluminum $H^{+-}$—$Al^{+3}(Si^{+4})$:

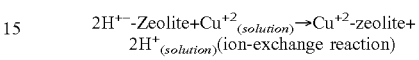

The resulting modified Cu/zeolite was obtained from commercial Cu/zeolite, company A after 5 consecutive steps: first citrate treatment, intermediate calcinations, second citrate treatment, ion-exchange with copper nitrate, final calcinations. Samples of Cu/zeolite from other companies were also successfully modified. The samples were evaluated under SCR—NH3 conditions using the reaction mixture NO—500 ppm, $NH_3$—600 ppm, $O_2$—10 vol. %, $H_2O$—10% and balance nitrogen.

Figure 3:
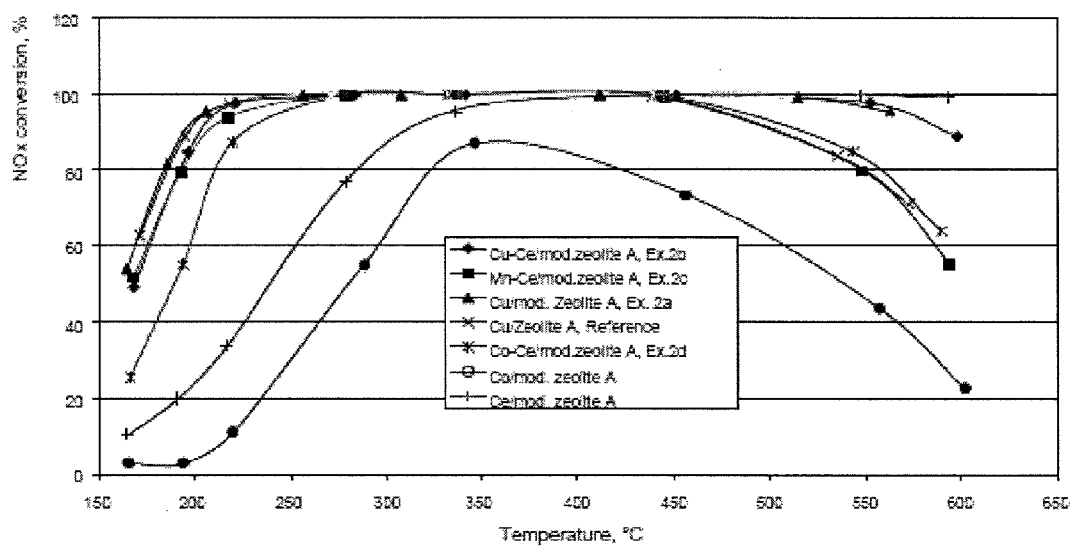
FIG. 3: $NO_x$ conversion on SCR catalysts of the current invention and reference SCR catalysts for $NH_3$–SCR reaction, reaction temperature range 150-600° C., SV=30 000 h$^{-1}$. Reaction mixture: NO—500 ppm, $NH_3$—600 ppm, $O_2$—10 vol. %, $H_2O$—10% and balance nitrogen. All catalysts were hydrothermally treated for 1 h in the mixture of 10% $O_2$ and 10% water at 600° C. before testing.

This new modified zeolite has practically the same low-temperature performance as original Cu/zeolite from company A, as presented in FIG. 3, but it has significantly higher $NO_x$ conversion at temperatures above 450° C., while for original Cu/zeolite $NO_x$ conversion declined due to too high rate of ammonia oxidation. The behavior of thus modified Cu/zeolite is similar to that of Fe/zeolite SCR catalysts, having low rate of ammonia oxidation at high temperatures and high performance at these temperatures (high $NO_x$ conversion) accordingly. This new Cu/modified zeolite catalyst is the first example of zeolite SCR catalyst, which is effective both at low and high-temperature range, while commercial Cu/zeolite SCR catalysts active at low temperatures, but have bad performance at high temperatures, meantime commercial Fe/zeolites have the opposite behavior, namely the bad performance at low temperatures and excellent $NO_x$ conversion at high temperatures.

The removal of extra-lattice aluminum species is important, because small and highly charged $Al^{+3}$ ions compete and replace $Cu^{+2}$ in ion-exchange positions and migrated to extra-lattice position copper ions are not active more in SCR and active in ammonia oxidation instead.

Figure 4:
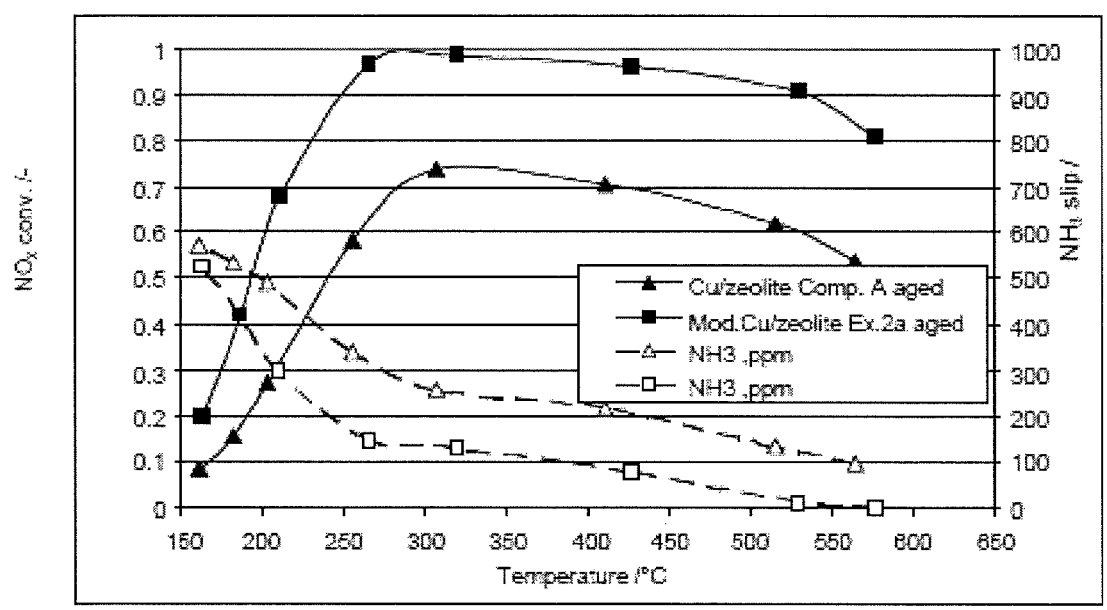
FIG. 4: The comparison of $NO_x$ reduction performance and ammonia slip of de-greened (hydrothermally treated at 600 C for 1 h) and hydrothermally aged at 900° C. for 1 h for reference Cu/zeolite A, and Cu/modified zeolite of the current invention, Example 2a. Reaction temperature range 150-600° C., SV=30 000 h$^{-1}$. Reaction mixture: NO—500 ppm, $NH_3$—600 ppm, $O_2$—10 vol. %, $H_2O$—10% and balance nitrogen.

In addition, and what is very important for applications, this kind of modification gives an excellent thermal stability for Cu/zeolite, as shown in FIG. 4. As one can see, there was no practically deactivation of modified Cu/zeolite, Example 2a after very severe hydrothermal aging at T=900° C., while original Cu/zeolite performance decreased significantly and became worse at all temperatures than that of modified Cu/zeolite, Example 2a of the current invention. Similar results with improvement were obtained for modified Cu/zeolites from companies B and C. Zeolites without commercial Cu coating also can be modified, in this case only the calcinations at T=600° C. and the following citrate treatment is necessary.

Figure 5:
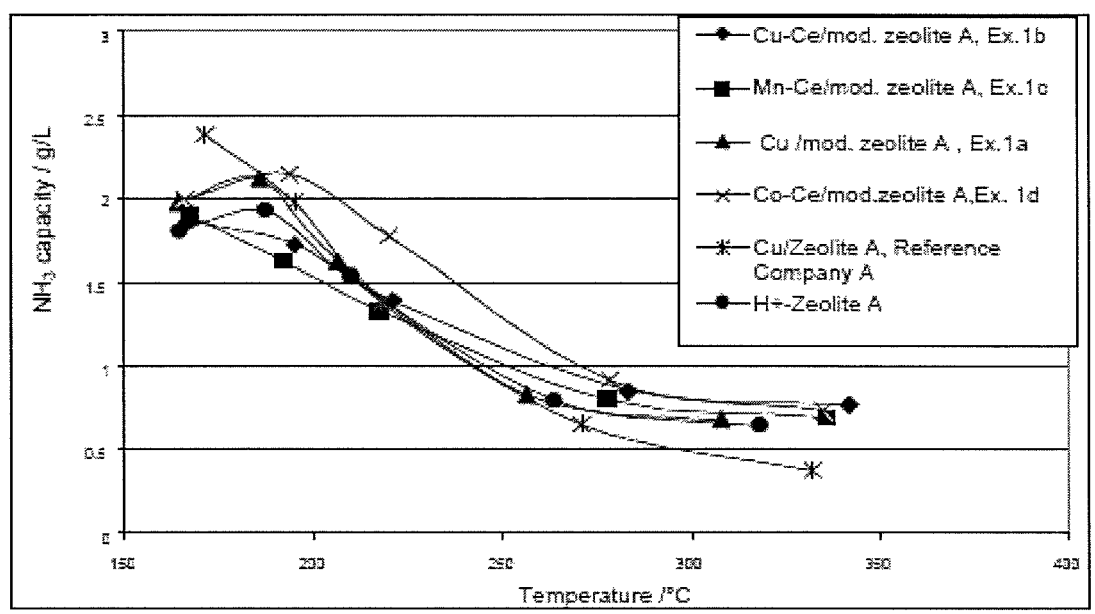
FIG. 5: Ammonia storage capacity at different temperatures, for SCR catalysts of the current invention, reference Cu/zeolite Company A, and reference H$^+$-form of zeolite company A.

Generally, commercial Cu/zeolites are over-exchanged with Cu, e.g. they have more Cu than can be obtained by ion-exchange. On contrary, the Cu/modified zeolite has some protonic sites, e.g. not all acidic sites are occupied by Cu ions and are free, so this modified Cu/zeolite is something intermediate between commercial Cu/zeolite, where all sites occupied by Cu and $H^+$-zeolite, where all ion-exchangeable sites are protonic. This H$^+$-zeolite was prepared from original Cu/zeolite, company A using double ion-exchange with ammonium nitrate with intermediate and final calcinations to convert NH$_4^+$-form of zeolite to H$^+$-form. Further, the ammonia adsorption capacity of H$^+$-zeolite, original Cu/zeolite from company A and modified zeolites from this invention were compared, as shown in FIG. 5. As can be seen from this Figure, original Cu/zeolite has higher concentration of weakly-adsorbed ammonia with ammonia desorption at temperatures 150-200° C., meantime protonic (H$^+$-form of zeolite) has higher fraction of strongly-bounded ammonia with desorption temperatures of 275-350° C. The modified zeolites of the current invention are resemble more H$^+$-zeolite than original Cu/zeolite A zeolite, having lower amount of weakly adsorbed ammonia and higher amount of strongly adsorbed ammonia indicating that there are many free protonic sites in modified Cu/zeolite of the current invention. In addition, this citrate treatment after calcinations at T=600° C. also removes weak acidic sites having neighboring Al—O—Al bounds and creates more strong isolated acidic sites in zeolite.

Based on this study, it is possible to propose that modified Cu/zeolites, which have larger amount of strongly-bounded ammonia, should have an advantage for combined LNT-SCR applications, especially to solve the problem of transition from ECE to EUDC part of driving cycle. This was confirmed, as it will be presented in the next section for combined LNT-SCR testing.

However, this Cu/modified catalyst of the invention has the same problem as original commercial Cu/zeolite SCR catalyst, namely they both are not active in CO oxidation and cannot reduce CO emissions in the case of CO breakthrough from LNT catalyst during rich pulses. As shown in Table 3, the CO concentration after SCR catalyst during the testing of SCR catalysts under Lean/Rich (L/R) conditions was even higher than CO concentration in rich pulse, indicating some additional CO formation on SCR catalysts, obviously for the account of partial oxidation of HC (namely propylene) to carbon monoxide—CO.

These SCR catalysts were not able to cope with CO emissions during rich pulses, even at T=400° C., leaving the large part of CO unconverted to CO$_2$. Our modified Cu/zeolite catalyst with lower copper loading was less active than original Cu/zeolite catalyst in CO oxidation.

TABLE 3

Maximal CO concentration in ppm during rich pulses under L/R cycles over SCR catalysts; Reaction conditions: SV = 10000$^{-1}$, feed flow rate 3.3 l/min. Lean conditions: NO 750 ppm, O$_2$—10.0%, CO$_2$—5.0%, H$_2$O—5.0%, N$_2$—balance t = 1 min. Rich conditions: C$_3$H$_6$—0.33%, CO—2.0% (20000 ppm), O$_2$—0.5%, CO$_2$—5.0%, H$_2$O—5.0%, N$_2$—balance t = 10 sec. SV = 10 000 h$^{-1}$.

| Catalyst | T = 175° C. | T = 200° C. | T = 250° C. | T = 300° C. | T = 350° C. | T = 400° C. |
|---|---|---|---|---|---|---|
| Cu/zeolite Company A | 20025 | 20250 | 20500 | 16770 | 14400 | 13200 |
| Modified Cu/zeolite, Ex. 2a | 20000 | 20 250 | 20 500 | 21000 | 19200 | 17850 |

To solve this problem, other elements were introduced to modify Cu/zeolite catalyst and to develop SCR catalyst without copper, using zeolites leached from copper after citrate treatment. The introduction of second ion into the zeolite is very complicated in general due to the competition of different ions for the acidic ion-exchangeable sites of zeolite. However, it has been found that the introduction of ceria was very beneficial for modified Cu/zeolite. The preparation is described in Example 2b of the current invention, with impregnation using cerium (III) nitrate after ion-exchange with copper nitrate. The large cerium ion cannot compete with smaller Cu ion for acidic sites and it is converting to ceria (cerium dioxide) particles in zeolite, located basically in extra-lattice positions, practically without occupation of ion-exchangeable sites, where copper ions are located. Therefore there is a unique chance to keep practically all the activity of Cu/zeolite, because ceria is positioned in other non-protonic locations of zeolite and to obtain the additional valuable properties due to the ceria presence.

Further, the behavior of ceria-only/modified zeolite, obtained by impregnation with cerium nitrate after double leaching of the original Cu/zeolite Company A, with citrate solution, has been studied. The ceria-only/zeolite SCR catalyst revealed quite good SCR—NH$_3$ properties and provided practically the same activity which was usually observed for Fe/zeolite catalysts with very high performance and NO$_x$ conversions near 100% at high temperatures, as shown in FIG. 3. Optimal ceria loading was found to be 1-2 mmol/per core of zeolite-washcoated cordierite. However, the ceria-only SCR catalyst was not able to provide good activity at temperatures below 300° C. like Fe/zeolite catalysts. However, for Cu—Ce/modified zeolite of the current invention, Example 2b, it was found that NO$_x$ conversion is high even at low temperatures and it is very close to that of Cu/modified zeolite/Example 2a, as can be seen in FIG. 3.

It had to be taken into account however that this Cu—Ce/zeolite catalyst combining Cu-only and ceria-only/zeolite has the additional active ceria centers, as it is clear from the study of Ce-only SCR catalyst, and it is presented in FIG. 3. Therefore, such a type of catalyst may have better performance at high space velocities and temperatures above 300° C., which are typical for EUDC (extra-urban driving conditions) for passenger cars and generally for heavy-duty applications.

The other possible advantage of ceria-containing zeolites is the NO$_x$ absorption properties of ceria. For such acidic support as zeolites, it is not possible to expect any NO$_x$ storage properties and capacity, meantime ceria has moderate basic properties and can store NO$_x$ until moderate temperatures. For combined LNT-SCR applications, it is desirable to have additional NO$_x$ storage capacity on SCR catalyst, taking into account that the temperatures on downstream SCR catalyst will be generally lower than for upstream LNT catalyst. As it will be shown below, additional NO$_x$ storage of SCR is important to improve the performance of combined LNT-SCR system.

Figure 6:
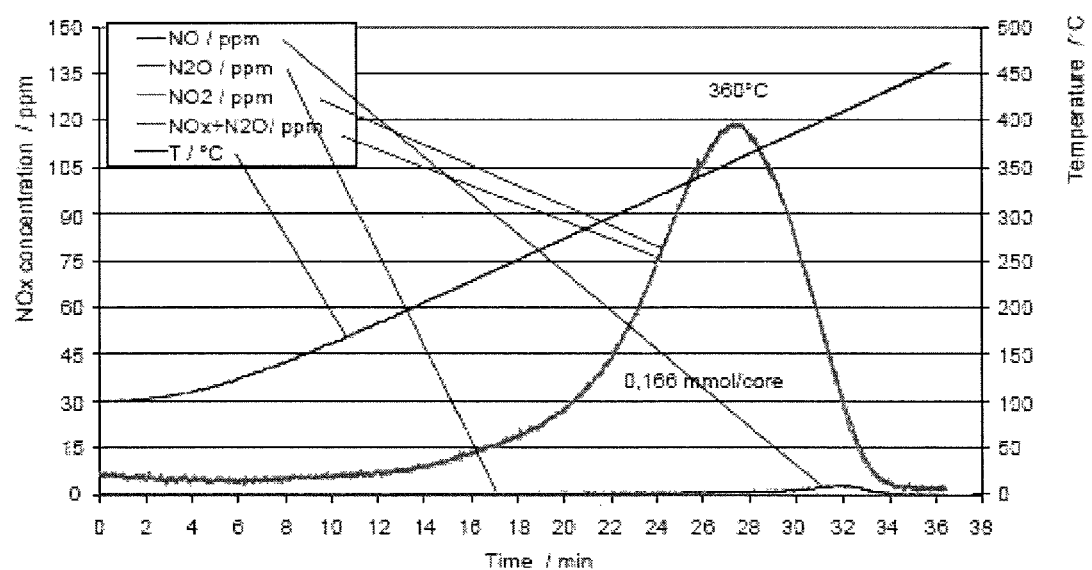
FIG. 6: $NO_x$ storage capacity of SCR catalyst of the current invention, Example 2b (Cu—Ce/modified zeolite), NOx desorption after NO adsorption at T=300-100° C., SV=10000 h$^{-1}$, reaction conditions: NO—750 ppm, $O_2$—10.0%, $CO_2$—5.0%, $H_2O$—5.0%, $N_2$—balance.

To evaluate possible NO$_x$ storage of Cu—Ce/modified zeolite A, Example 2b, the core was exposed to lean reaction mixture NO—750 ppm, O$_2$—10.0%, CO$_2$—5.0%, H$_2$O—5.0%, N$_2$—balance with the following switching off of NO feed and temperature raising until the complete NO$_x$ desorption. After short exposition to lean mixture for 3 minutes at T=150° C., only NO was released during desorption in the amount of 0.025 mol/core with desorption maximum at 220° C. Definitely, the temperature was low enough for SCR catalyst to produce NO$_2$ by NO oxidation. To evaluate the maximal possible NO$_x$ adsorption, the core was exposed to lean reaction mixture at 300° C. for 30 minutes with the following temperature decrease to 175° C., and following temperature ramp after switching off NO. The results are presented in FIG. 6. Under these conditions, NO$_2$ was basically released with the temperature of maximal NO$_x$ desorption near 360° C. and amount of released NO$_x$ was 0.166 mmol/core. It is necessary to note, that for LNT-SCVR applications, SCR catalyst will be supplied with $NO_2$ from LNT catalyst, which is more active in NO oxidation, so this maximal $NO_x$ capacity can be easily reached on SCR catalyst even at low temperatures. The third possible advantage is that ceria can facilitate CO oxidation on SCR catalyst, as it will be presented in the next section. Ceria is not the best catalyst for CO oxidation, but it has some moderate activity in CO oxidation.

The other direction was an attempt to obtain non-copper active SCR—$NH_3$ catalyst. The finding was that the addition of some transition metals, namely Mn (manganese) and Co (cobalt) can greatly improve the performance of ceria/zeolite SCR catalyst at low temperatures. It can be proposed that such metal oxides can produce $NO_2$, which can be used by ceria and it should improve the performance at low temperatures like it has been observed for Fe/zeolite catalyst by addition of $NO_2$ to reaction mixture. However, here $NO_2$ can be generated on SCR catalyst itself by NO oxidation on cobalt and manganese oxides. When zeolite, leached from copper, was further ion-exchanged with cobalt or manganese nitrate with the following deposition of ceria, the improvement was very small, so it seems to be that isolated ion-exchanged cobalt and manganese ions were not able to effectively generate $NO_2$. However, the performance was greatly improved when higher amounts of cobalt and manganese were deposited together with ceria, as described in Examples 2c and 2d of the current invention. As a result, the performance in $NH_3$—SCR of Mn—Ce/modified zeolite SCR catalyst, Example 2b, increased significantly and it was basically the same as of original Cu/zeolite catalyst of company A, as can be seen in FIG. 3.

This is the first example of non-copper zeolite-based SCR catalyst, which has the same level of activity at low temperatures as Cu/zeolite in $NH_3$—SCR reaction. The activity of Co—Ce/modified zeolite was slightly lower, but this type of SCR catalyst had also reasonably good low-temperature activity. These samples were however not as good at high-temperature range as Cu/modified zeolite or Cu—Ce/modified zeolite of the current invention, Example 2a and 2b, which both had an excellent high-temperature performance similar to Fe/zeolite. The reason of it might be that cobalt oxide and manganese oxide are too active in ammonia oxidation at high temperatures, and it decreases the high-temperature performance like for commercial Cu/zeolite formulations. Nevertheless, the performance of Co—Ce and Mn—Ce/modified zeolite was comparable with those of commercial Cu/zeolite SCR catalyst company A, within all temperature range, as illustrated in FIG. 3. These new SCR catalysts are stable enough, because activity was measured after calcinations and the following hydrothermal treatment at 600° C. These Co—Ce and Mn—Ce/modified zeolite catalysts can keep of course the same potential advantages of ceria-containing zeolites.

Combined LNT-SCR Evaluation

For combined LNT-SCR testing, the SCR core sample was placed downstream of LNT core sample (both cores had the same 1"×1.5" size with small gap 5 mm between the cores). The same kind of L/R cycling testing was carried out as for LNT-alone catalysts. For this testing, LNT catalysts having similar performance under L/R cycles were selected to better evaluate the effect of downstream SCR catalyst. Three commercial LNT prototypes from 3 different companies and one catalyst of the current invention, Example 1A were selected for such comparative testing. The results of testing for combined LNT-SCR system and comparison with LNT-alone catalyst are shown in Tables 4 and 6.

TABLE 4

Activity of LNT, SCR and combined LNT-SCR (SCR catalyst downstream of LNT catalyst) under alternating Lean/Rich (L/R) cycles; Lean: NO—750 ppm, $O_2$—9.6%, $CO_2$—5%, $H_2O$—5%, $N_2$—bal t = 1 min. Rich: $C_3H_6$—0.33%, CO—2%, $O_2$—0.5% $CO_2$—5%, $H_2O$—5%, $N_2$—bal t = 10 s; SV = 10 000 $h^{-1}$ for LNT and SCR catalysts.

| Catalyst | T = 175° C. $X_{NO}$% | T = 200° C. $X_{NO}$% | T = 225° C. $X_{NO}$% | T = 250° C. $X_{NO}$% | T = 300° C. $X_{NO}$% | T = 350° C. $X_{NO}$% | T = 400° C. $X_{NO}$% |
|---|---|---|---|---|---|---|---|
| LNT company A Pt-100 Pd-0-Rh-10 | 25 | 44 | 66 | 80 | 93 | 90 | 79 |
| SCR company A Cu/zeolite A | 3 | 6 | 10 | 15 | 24 | 16 | 10 |
| LNT + SCR company A combined | 29 | 49 | 75 | 89 | 96 | 92 | 83 |
| SCR invention, example 2a | 4 | 13 | 15 | 18 | 23 | 24 | 18 |

The own activity of several SCR-alone catalysts was tested as well, as presented in Table 4. Generally, the addition of downstream SCR catalyst improved the $NO_x$ conversion for all LNTs tested, including the catalysts of the current invention and commercial LNTs. Meantime de-greened-only (calcined at T=600° C. for 2 h) commercial LNTs do not produce ammonia at all or produce only trace quantities of ammonia, as shown in Table 1, so the increase of $NO_x$ conversion by addition of downstream SCR catalyst requires another explanation. The testing of SCR-only catalysts, as can be seen in Table 4, revealed that SCR catalysts have their own catalytic activity under Lean/Rich cycles, definitely for the account of CO and HC(propylene) acting as reductants during the rich pulses. The activity was quite moderate, namely $NO_x$ conversion below 25% was found, but observed $NO_x$ conversion on SCR-alone catalyst is enough to explain the increase of $NO_x$ conversion for commercial LNTs after the addition of SCR catalyst even without any ammonia production. From Table 4, the observed $NO_x$ conversion for LNT+SCR catalysts, company A is very close to the sum of $NO_x$ conversion on LNT-alone Company A and SCR-alone Company A. As an example, at T=200° C. $NO_x$ conversion on LNT A was 44%, $NO_x$ conversion on SCR was 6%, total conversion should be 44+6=50%, meantime observed conversion on LNT-SCR, company A is 49% at T=200° C.

This is valid for temperatures, where NO$_x$ conversion and reductant consumption is not high on LNT; the contribution of second SCR catalyst will be lower at the temperatures, where LNT catalyst is consuming the most of reductants.

TABLE 5

Activity of SCR catalysts under lean conditions; Reaction mixture:
NO—200 ppm, C3= ~250 ppm, CO—1250 ppm, CO2—5.0%,
H2O—5.0%, O2—10%, N2—balance; SV = 10 000 h$^{-1}$.

| | NO$_x$-conversion % | | | | | | | | |
|---|---|---|---|---|---|---|---|---|---|
| Catalyst | 200° | 225° | 250° | 275° | 300° | 325° | 350° | 375° | 400° |
| Cu/zeolite Company A | 0 | 0 | 1 | 9 | 7 | 16 | 10 | 7 | 6 |
| Ex. 2a Cu/modified zeolite | 0 | 1 | 5 | 10 | 11 | 8 | 7 | 4 | 3 |
| Ex. 2b, Cu—Ce/zeolite | 1 | 6 | 14 | 12 | 9 | 5 | 2 | 2 | 0 |
| Ex. 2c, Cu—Mn/zeolite | 0 | 2 | 10 | 14 | 15 | 16 | 10 | 5 | 2 |
| Ex. 2d, Cu—Co/zeolite | 0 | 3 | 9 | 12 | 10 | 10 | 4 | 2 | 0 |

One can see that the contribution of the SCR catalyst is lower at temperatures above 225° C., where practically all CO and big part of polypropylene were converted on LNT catalyst of company A.

It was found that our modified Cu/zeolite SCR catalyst, Example 2a, obtained by citrate treatment of commercial Cu/zeolite, company A and following re-insertion of copper, is more active than original Cu/zeolite company A in CO—HC SCR during rich pulses, as shown in Table 4, especially at low temperatures up to 300° C. Therefore, this kind of treatment and modification is favorable to increase the low-temperature performance of SCR zeolite catalyst by reaction with CO and HC during rich pulses and to increase a low-temperature performance of combined LNT-SCR system accordingly.

Generally, Diesel exhaust also contains some limited amounts of CO and HC under lean-only conditions without any rich pulses. SCR catalysts of the invention and company A were tested under lean-only conditions to evaluate possible NO$_x$ reduction, using the mixture simulating typical Diesel exhaust conditions. Results are presented in Table 5. As can be seen from this Table, all the catalysts of invention are more active relative to commercial SCR catalyst up to T=325° C. under lean conditions. Commercial SCR catalyst is more active at higher temperatures, however at these temperatures CO and HC are typically completely oxidized by upstream LNT catalyst and SCR catalyst has no reductants to convert NO$_x$. The results show that the SCR catalysts of invention can provide some additional passive NO$_x$ reduction even without rich pulses for combined LNT-SCR applications.

The basic data of evaluation for combined LNT-SCR applications are presented in Table 6.

Generally, as can be seen from Table 6, the performance of combined LNT-SCR systems of the current invention, using LNT catalyst, Example 1a, and four different SCR catalysts of invention, Examples 2a-2d, was obviously better than that of commercial pairs LNT+SCR from 3 different companies. Among catalyst tested, the combination of LNT catalyst Pt—Pd—Rh/Ca—La—Ce with Cu—Ce/modified zeolite was the best. It is opening the way to significantly reduce the cost of aftertreatment systems for Diesel and also for lean-gasoline applications, combined with better performance within whole temperature range. The NO$_x$ reduction above 80% was obtained already at T=225° C. and practically complete NO$_x$ conversion was observed at T=250° C. for all combinations of the current invention, while NO$_x$ reduction was from 5 to 15% lower under the same conditions for commercial LNT-SCR pairs.

Figure 7:
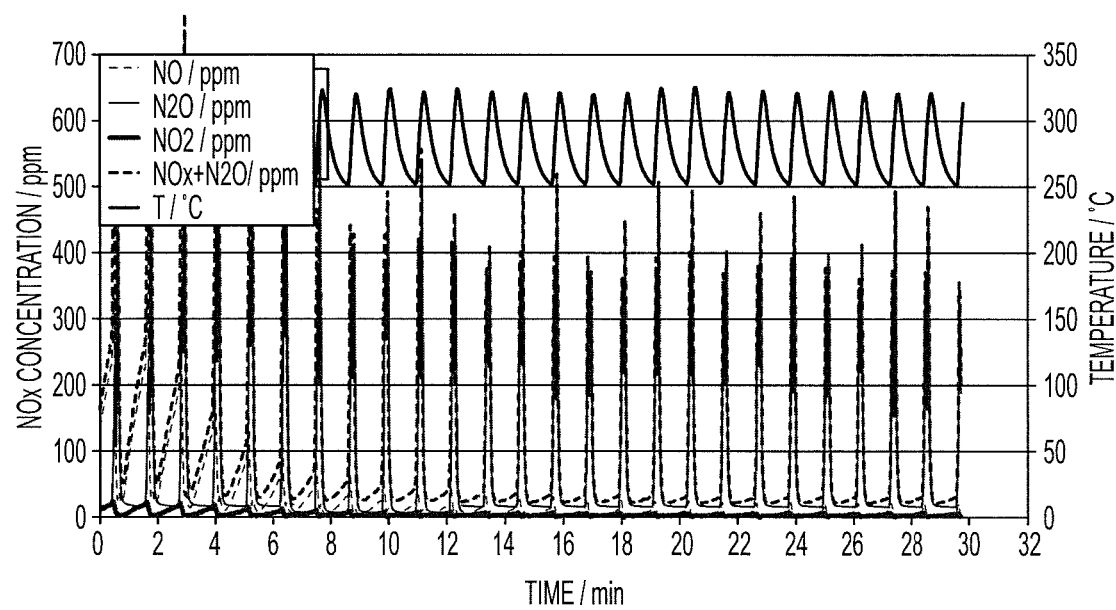
FIG. 7: $NO_x$ profile for combined LNT-SCR testing of catalysts of the current invention, LNT Example 1a+SCR Example 2c, T=250° C., lean conditions: NO—750 ppm, $O_2$—10.0%, $CO_2$—5.0%, $H_2O$—5.0%, $N_2$—balance t=1 min, rich conditions: $C_3H_6$—0.33%, CO—2.0%, $O_2$—0.5%, $CO_2$—5.0%, $H_2O$—5.0%, $N_2$—balance, t=10 sec; SV=10000 h$^{-1}$.

The typical NO$_x$ profile during L/R cycles at T=250° C. is shown in FIG. 7 for combination of LNT Example 1a+SCR Example 2c (Mn—Ce/modified zeolite). The performance of LNT-SCR pairs of the current invention was also better at higher temperatures, providing practically complete NO$_x$ reduction from 300° C. up to 400° C., however was generally lower relative to the LNT-SCR pairs of the invention. From this testing and evaluation, it is difficult to evaluate if better ammonia production from LNT or better NO$_x$ reduction by SCR using CO and HC as reductant during rich pulses may be responsible for better performance of LNT-SCR catalysts of the invention, because both events occur at the same time during rich pulses. More probably from this testing is that both effects lead to this improvement and make their contribution to better $NO_x$ reduction.

Figure 8:
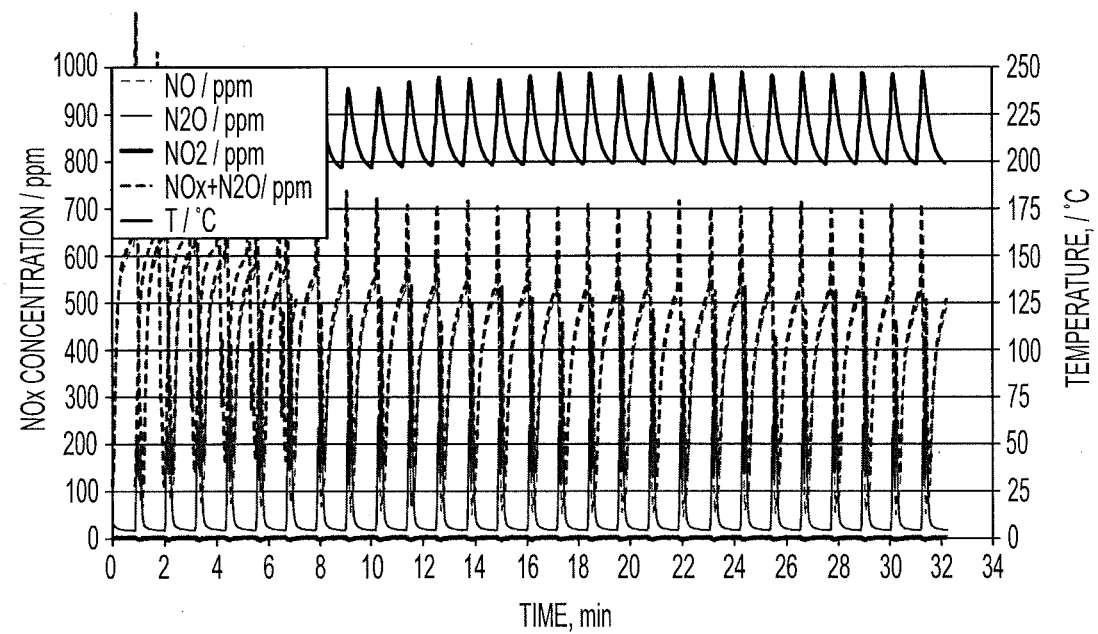
FIG. 8: $NO_x$ profile for combined LNT-SCR testing of catalysts of the current invention under L/R conditions, LNT Example 1a+SCR Example 2a, Cu/modified zeolite, T=200° C., lean conditions: NO 750 ppm, $O_2$—10.0%, $CO_2$—5.0%, $H_2O$—5.0%, $N_2$—balance t=1 min, rich conditions: $C_3H_6$—0.33%, CO—2.0%, $O_2$—0.5%, $CO_2$—5.0%, $H_2O$—5.0%, $N_2$—balance, t=10 sec; SV=10000 h$^{-1}$.
Figure 9:
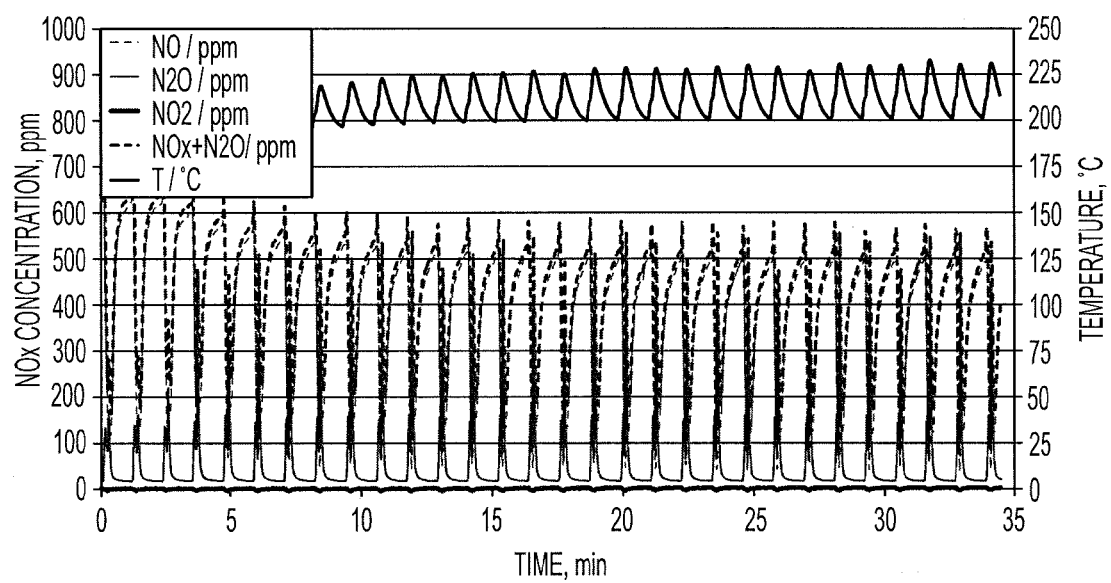
FIG. 9: $NO_x$ profile for combined LNT-SCR testing of catalysts of the current invention under L/R conditions, LNT Example 1a+SCR Example 2b, Cu—Ce/modified zeolite, T=200° C., lean conditions: NO 750 ppm, $O_2$—10.0%, $CO_2$—5.0%, $H_2O$—5.0%, $N_2$—balance, t=1 min, rich conditions: $C_3H_6$—0.33%, CO—2.0%, $O_2$—0.5%, $CO_2$—5.0%, $H_2O$—5.0%, $N_2$—balance, t=10 sec; SV=10000 h$^{-1}$.

In addition, the effect of additional $NO_x$ storage of ceria-containing SCR of this invention was found, providing additional $NO_x$ reduction, as shown in FIGS. 8 and 9.

Example 2b (Cu—Ce) of the current invention, as shown in FIG. 9, has added ceria to Cu/modified zeolite, Example 2a, FIG. 8. $NO_x$ profiles for these samples under L/R cycles are different, the addition of ceria reduces the heights of sharp NO desorption peaks in the beginning of rich pulses at T=225° C., as one can see on FIG. 9. It can be considered that it is connected with adsorption of $NO_x$ released from LNT on $NO_x$ adsorption sites of ceria. It gives ca. 5% of better $NO_x$ reduction.

TABLE 6

Performance of commercial LNT + SCR catalysts and LNT + SCR of the invention under alternating Lean/Rich (L/R) cycles; Lean: NO—750 ppm, $O_2$—9.6%, $CO_2$—5%, $H_2O$—5%, $N_2$—bal t = 1 min. Rich: $C_3H_6$—0.33%, CO—2%, $O_2$—0.5% $CO_2$—5%, $H_2O$—5%, $N_2$—bal t = 10 s; SV = 10 000 $h^{-1}$ for LNT and SCR catalysts.

| Catalyst | T = 175° C. $X_{NO}$ % | T = 200° C. $X_{NO}$ % | T = 225° C. $X_{NO}$ % | T = 250° C. $X_{NO}$ % | T = 300° C. $X_{NO}$ % | T = 350° C. $X_{NO}$ % | T = 400° C. $X_{NO}$ % |
|---|---|---|---|---|---|---|---|
| LNT company A Pt-100 Pd-0-Rh-10 | 25 | 44 | 66 | 80 | 93 | 90 | 79 |
| LNT + SCR company A (Cu-zeolite A) combined | 29 | 49 | 75 | 89 | 96 | 92 | 83 |
| LNT company B Pt-108 Pd-4 Rh-8 | 31 | 36 | 63 | 85 | 92 | 88 | 82 |
| LNT + SCR company B (Cu-zeolite B) combined | 33 | 39 | 70 | 92 | 96 | 91 | 84 |
| LNT company C Pt-100 Pd-20 Rh-10 | 29 | 38 | 62 | 86 | 96 | 92 | 87 |
| LNT + SCR company C (Cu-zeolite A) combined | 31 | 45 | 71 | 94 | 98 | 95 | 90 |
| LNT Invention, Ex. 1a Ca—La—Ce mixed oxide Pt-30 Pd-15 Rh-5 | 30 | 39 | 68 | 86 | 96 | 96 | 90 |
| LNT + SCR Invention LNT Ex. 1a + SCR Ex. 2a, modified Cu/zeolite | 32 | 47 | 82 | 97 | 97 | 99 | 94 |
| LNT + SCR Invention, LNT Ex. 1a + SCR Ex. 2b Cu—Ce/zeolite | 34 | 52 | 89 | 99 | 100 | 98 | 92 |
| LNT + SCR Invention, LNT Ex. 1a + SCR Ex. 2c Mn—Ce/zeolite | 29 | 49 | 85 | 98 | 99 | 98 | 91 |
| LNT + SCR Invention, LNT Ex. 1a + SCR Ex. 2d Co—Ce/zeolite | 30 | 45 | 83 | 98 | 100 | 99 | 95 |

It is important to notice that any detectable ammonia slip was not observed for combined LNT-SCR as presented in Table 7, despite of high ammonia production on LNT catalysts of the current invention. Table 7 is illustrating that for combined LNT+SCR catalysts of the current invention there is no problem with ammonia slip, due to the action of a downstream SCR catalyst, and all SCR catalysts of the current invention can provide additional HC reduction in comparison with LNT-alone application.

However, the problem for Cu-only/modified zeolite, Example 2a is an additional CO production, because such a catalyst is not active in CO oxidation like commercial Cu/zeolite catalysts. The probable reason is that copper is quickly reducing in the beginning of rich pulses and cannot provide the desirable oxidation of CO. However, the addition of ceria, which can release the additional oxygen from its lattice during rich pulses, eliminated this problem and provided additional CO reduction in comparison with LNT-alone, as can be seen from comparison of Examples 1a for LNT-alone and its combination with ceria-containing SCRs, as one can see in Table 7. The addition of ceria also improved slightly the reduction of propylene in comparison with Cu-alone/modified zeolite.

TABLE 7

Dependence of maximal $N_2O$, $NH_3$, $C^-_3$ and CO concentrations on catalysts from temperature during Rich pulses; Rich conditions: $C_3H_6$—3300 ppm, CO—20000 ppm, $O_2$—0.5% $CO_2$—5%, $H_2O$—5%, $N_2$—bal t = 10 s.

| Catalyst | | 175° C. | 200° C. | 250° C. | 300° C. | 350° C. | 400° C. |
|---|---|---|---|---|---|---|---|
| LNT Ex. 1a | NH3/ppm | 110 | 485 | 1145 | 450 | 420 | 55 |
| | CO/ppm | 7570 | 4075 | 600 | 550 | 425 | 320 |
| | $C^-_3$/ppm | 2400 | 1800 | 525 | 110 | 0 | 0 |
| LNT Ex. 1a + | NH3/ppm | 0 | 0 | 0 | 0 | 0 | 0 |
| SCR Ex 2a | CO/ppm | 8700 | 6600 | 950 | 1600 | 2100 | 1900 |
| Cu/mod. zeolite | $C^-_3$/ppm | 850 | 350 | 10 | 0 | 0 | 0 |
| LNT Ex. 1a + | NH3/ppm | 0 | 0 | 0 | 0 | 0 | 0 |
| SCR Ex 2b | CO/ppm | 6150 | 3180 | 400 | 25 | 0 | 0 |
| Cu—Ce/mod. zeolite | $C^-_3$/ppm | 850 | 245 | 0 | 0 | 0 | 0 |
| LNT Ex. 1a + | NH3/ppm | 0 | 0 | 0 | 0 | 0 | 0 |
| SCR Ex 2c | CO/ppm | 6980 | 4670 | 725 | 160 | 35 | 0 |
| Mn—Ce/mod. zeolite | $C^-_3$/ppm | 850 | 220 | 20 | 0 | 0 | 0 |

The use of advanced LNT and SCR formulations of the current invention also can solve the typical problem for current commercial formulations for combined LNT-SCR during transition from ECE part of cycle (city driving) to high-speed extra-urban driving (EUDC) part of NEDC cycle. Typically, the LNT catalyst is adsorbing $NO_x$ species during low-speed ECE part of cycle, and further release practically all adsorbed $NO_x$ to SCR catalyst during transition to extra-urban (highway) driving which is accompanied with sharp increase of temperature and flow rate. However, current commercial SCR catalyst can store only low amount of adsorbed ammonia to meet this big amount of released $NO_x$ and to react with it. In addition, current SCR catalyst keeps the most part of ammonia on weak acid sites, and this ammonia is releasing at temperatures above 200° C. to environment instead of reaction with $NO_x$. The amount of adsorbed ammonia on SCR can be increased by increasing the duration of rich pulses, but it is generally difficult to make rich pulses during ECE part of cycle and it leads to high fuel penalty. It also leads to enormous CO and HC emissions, because current LNT+SCR formulations cannot cope with CO and HC oxidation at low temperatures. In addition, current LNT formulations are not active in ammonia production. It leads to the observed phenomenon for engine testing, that the most of unconverted $NO_x$ was released during this transition from ECE to EUDC part of driving cycle.

Figure 10:
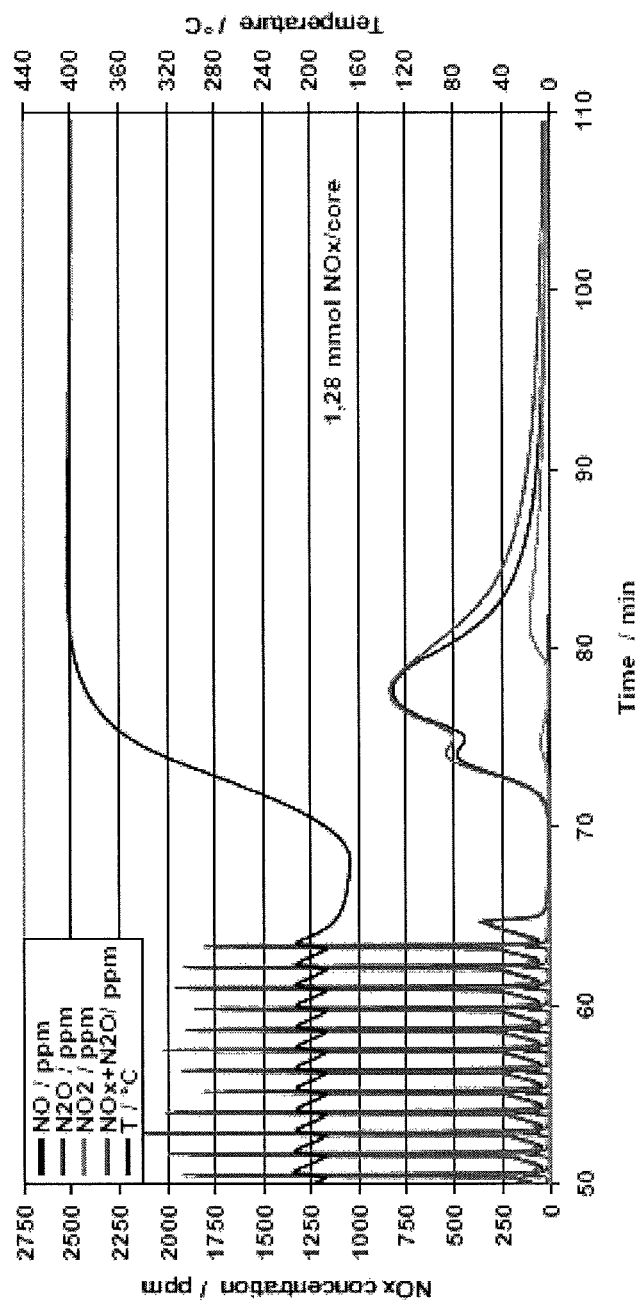
FIG. 10: $NO_x$ release during the simulation of transition from city driving (ECE) to extra-urban driving (EUDC) for combined LNT+SCR, reference LNT catalyst company A and reference SCR catalyst company A. L/R cycles for 60 minutes at T=175° C., with the following thermo-programmed desorption (TPD) in $O_2$—10.0%, $CO_2$—5.0%, $H_2O$—5.0%, $N_2$—balance, TPD ramp 20° C. per minute, lean conditions: NO 750 ppm, $O_2$—10.0%, $CO_2$—5.0%, $H_2O$—5.0%, $N_2$—balance, t=1 min, rich conditions: $C_3H_6$—0.33%, CO—2.0%, $O_2$—0.5%, $CO_2$—5.0%, $H_2O$—5.0%, $N_2$—balance, t=10 sec; SV=10000 $h^{-1}$.
Figure 11:
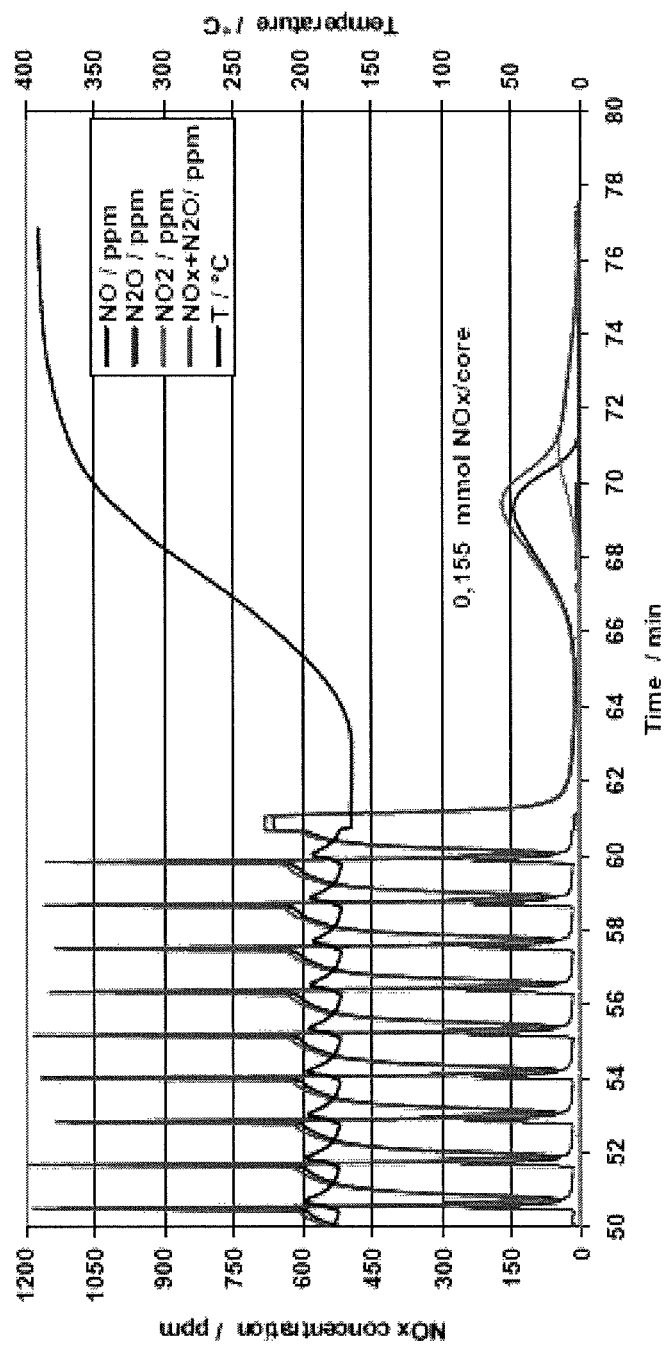
FIG. 11: $NO_x$ release during the simulation of transition from city driving (ECE) to extra-urban driving (EUDC) for combined LNT+SCR, LNT catalyst Example 1a of the current invention and SCR catalyst, example 2a of the current invention L/R cycles for 60 minutes at T=175° C., with the following thermo-programmed desorption (TPD) in $O_2$—10.0%, $CO_2$—5.0%, $H_2O$—5.0%, $N_2$—balance, TPD ramp 20° C. per minute, lean conditions: NO 750 ppm, $O_2$—10.0%, $CO_2$—5.0%, $H_2O$—5.0%, $N_2$—balance, t=1 min, rich conditions: $C_3H_6$—0.33%, CO—2.0%, $O_2$—0.5%, $CO_2$—5.0%, $H_2O$—5.0%, $N_2$—balance, t=10 sec. SV=10000 $h^{-1}$.

This transition was simulated by using first L/R cycles at low temperature 175° C., then after the last lean period the rich mixture was turned off and NO supply was switched off too, with further increase of temperature with maximal possible ramp 20° C. which leads to observed $NO_x$ release. The results are presented in Table 8 and FIGS. 10 and 11. The current commercial formulations release huge amounts of $NO_x$ in accordance with engine testing. The formulations of this invention meantime release only the small amounts of $NO_x$, up to one order lower than observed on commercial pairs. This should be partly the result of better ammonia production on LNT catalyst of the current invention, although temperature T=175° C. was low for effective ammonia generation on LNT Example 1a of the current invention.

TABLE 8

The amount of emitted $NO_x$ during the simulation of transition from ECE to EUDC

| CATALYST | $NO_x$ desorbed, mmol/core |
|---|---|
| LNT + SCR Company A | 1.28 |
| LNT + SCR Company B | 0.89 |
| LNT + SCR Company C | 1.30 |
| LNT Ex. 1a + SCR Ex. 2a Invention | 0.155 |
| LNT Ex. 1a + SCR Ex. 2a Invention | 0.132 |

The other advantage is dealing with more advanced SCR catalyst of the current invention, having higher concentration of strongly-adsorbed ammonia with desorption temperatures at T=275-350° C. From this point of view, the SCR catalyst of the current invention is more appropriate for combined LNT-SCR application, having free protonic $H^+$ sites for strong adsorption of ammonia, and copper ion sites $Cu^{+2}$, which are able to convert effectively $NO_x$ with ammonia at temperatures above 200° C. Commercial SCR have basically only $Cu^{+2}$ sites in zeolites with weak ammonia adsorption, while completely protonic $H^+$ form of zeolite can effectively store ammonia, but cannot convert $NO_x$ to desirable nitrogen. Ceria-containing SCR with upstream LNT, Example 1a, released even lower amount of $NO_x$ during transition simulation, relative to ceria-free CSR Example 2a, but the difference was relatively small.

Summarizing for this section, the LNT and SCR catalysts of the invention revealed big advantages for combined LNT-SCR applications regarding commercial LNT-SCR pairs from 3 different companies and offer lower cost and better performance for combined LNT-SCR applications.

Regarding application of LNT and SCR of the current invention for LNT-only and SCR-only applications, the directly apply LNT of the current invention for LNT-alone applications is not so optimal due to the effective generation of ammonia and problem of ammonia slip. Some adjustment may be necessary to decrease ammonia slip, for example the use of excessive ceria in formulation. Nevertheless, such type of proton-conducting mixed oxides for LNTs may offer a huge cost savings for aftertreatment systems for Diesel and Lean-Burn applications due to a very low PGM loading.

SCR catalysts of the current invention can be applied directly also for SCR-only applications using external ammonia sources, such as urea solutions, etc. The SCR catalysts of the current invention were tested for SCR-alone applications with ammonia as described above. As an example, the SCR catalyst, Example 2a of the invention, Cu/modified zeolite is the first example of SCR catalysts with ammonia, showing high performance under all temperature conditions of Diesel engines in contrast to commercial Cu/zeolite and Fe/zeolite with limited performance at high and low temperatures, accordingly. The excellent thermal and hydrothermal stability of the catalyst Example 2a, which is able to withstand 900° C. hydrothermal aging, allowing it to be a very good candidate for SCR coating on Diesel particulate filter, to withstand high temperatures during filter regeneration from soot, and for heavy-duty SCR applications. SCR catalyst Example 2b, Cu—Ce/modified zeolite has a close performance to that of Example 2a and may provide the additional advantages at high $NO_x$ levels and high space velocities. SCR catalysts Examples 2c and 2d (Mn—Ce and Co—Ce/modified zeolite) is the first example of non-copper SCR catalysts having comparable activity with Cu/zeolite commercial catalyst at low temperatures and similar performance for all temperature range.

However, the LNT and SCR catalysts of the invention are specially designed for combined LNT-SCR applications and both have the additional advantages for such applications. The LNT catalyst of the invention can generate effectively ammonia for SCR catalysts downstream and has a high low-temperature activity despite of low PGM loading.

The SCR catalysts of the invention have additional advantages in comparison with commercial SCR catalysts for combined LNT-SCR applications, namely higher ammonia storage capacity at high temperatures, better $NO_x$ reduction with CO and HC presented in Diesel exhaust. Ce-containing SCR catalysts of invention have also additional $NO_x$ storage and better CO oxidation properties than commercial SCR catalysts.

Further, LNT and SCR catalysts of the invention can be combined with other catalysts, especially with commercial LNT and SCR catalysts, but the performance is expected to be lower relative to using of both types (LNT and SCR) of catalysts of the invention.

Further, LNT and SCR catalysts of the invention can be combined with other aftertreatment devices, such as DOC, DPF or 3-way catalyst. As an example, LNT or SCR catalyst of this invention can be deposited on Diesel particulate filter (DPF), taking into account the high thermal stability of both LNT and SCR catalysts of the invention.

Figure 12:
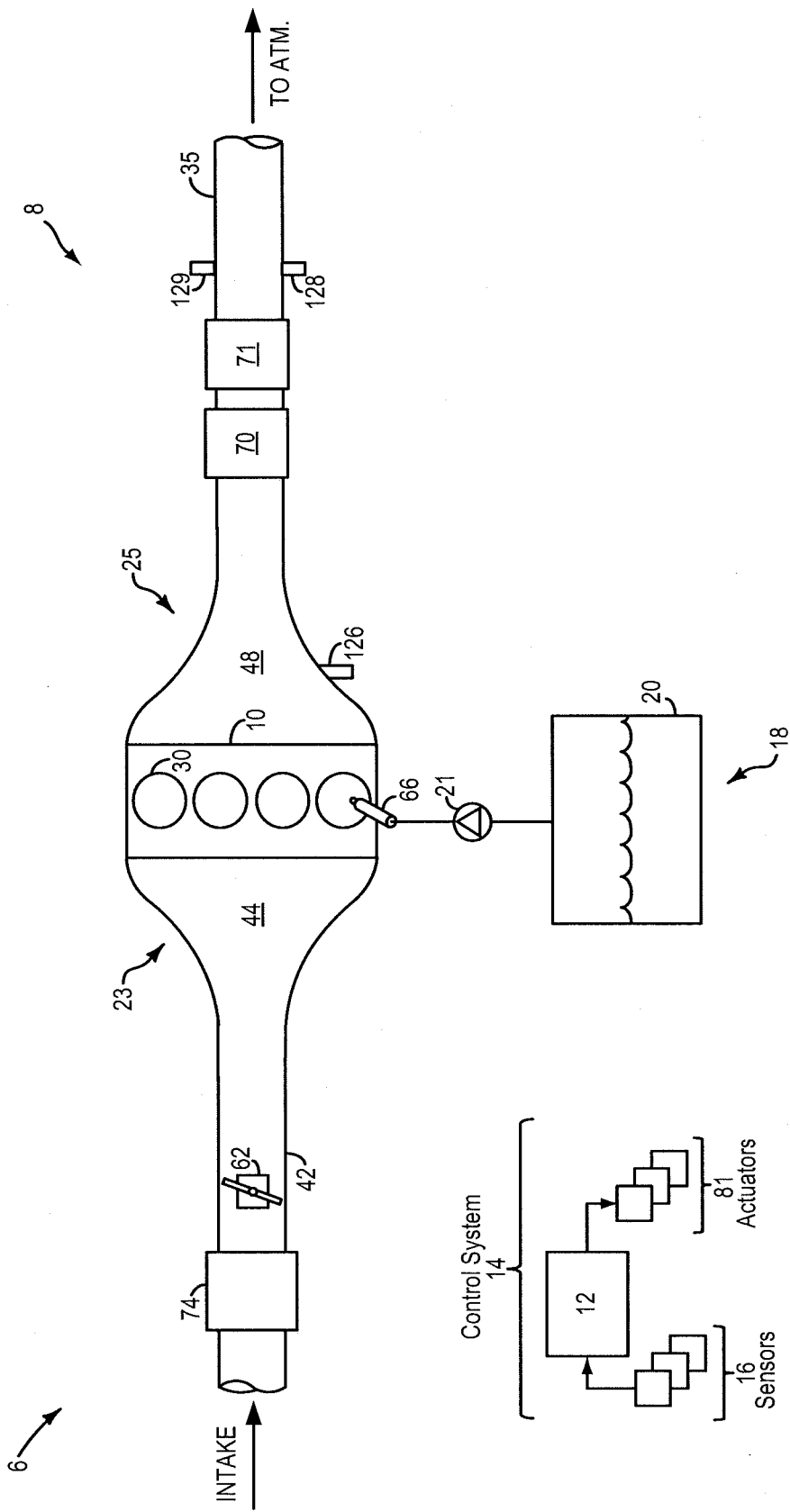
FIG. 12: schematically shows a non-limiting example of a vehicle system including an LNT and SCR.

FIG. 12 shows a schematic depiction of an engine system 8 including an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. Engine exhaust 25 includes an exhaust manifold 48 leading to an exhaust passage 35 that routes exhaust gas to the atmosphere. Engine exhaust 25 includes emission control devices 70 and 71 mounted in a close-coupled position. The emission control devices may include a three-way catalyst, lean NOx trap, SCR catalyst, diesel particulate filter, oxidation catalyst, etc. In one example, emission control device 70 may be an LNT catalyst and emission control device 71 may be an SCR catalyst. It will be appreciated that other components may be included in the engine, such as a variety of valves and sensors.

Engine system 8 may be coupled to a fuel system 18 including a fuel tank 20 coupled to a fuel pump system 21. Fuel tank 20 may hold a plurality of fuel blends, including fuel with a range of alcohol concentrations, such as various gasoline-ethanol blends, including E10, E85, gasoline, etc., and combinations thereof. Fuel pump system 21 may include one or more pumps for pressurizing fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control devices, temperature sensor 128, and pressure sensor 129. Other sensors such as additional pressure, temperature, air/fuel ratio, and composition sensors may be coupled to various locations in the vehicle system 6, as discussed in more detail herein. As another example, the actuators may include fuel injector 66, and throttle 62. The control system 14 may include a controller 12. The controller may receive input data from the various sensors, process the input data, and trigger the actuators in response to the processed input data based on instruction or code programmed therein corresponding to one or more routines.

Figure 13:
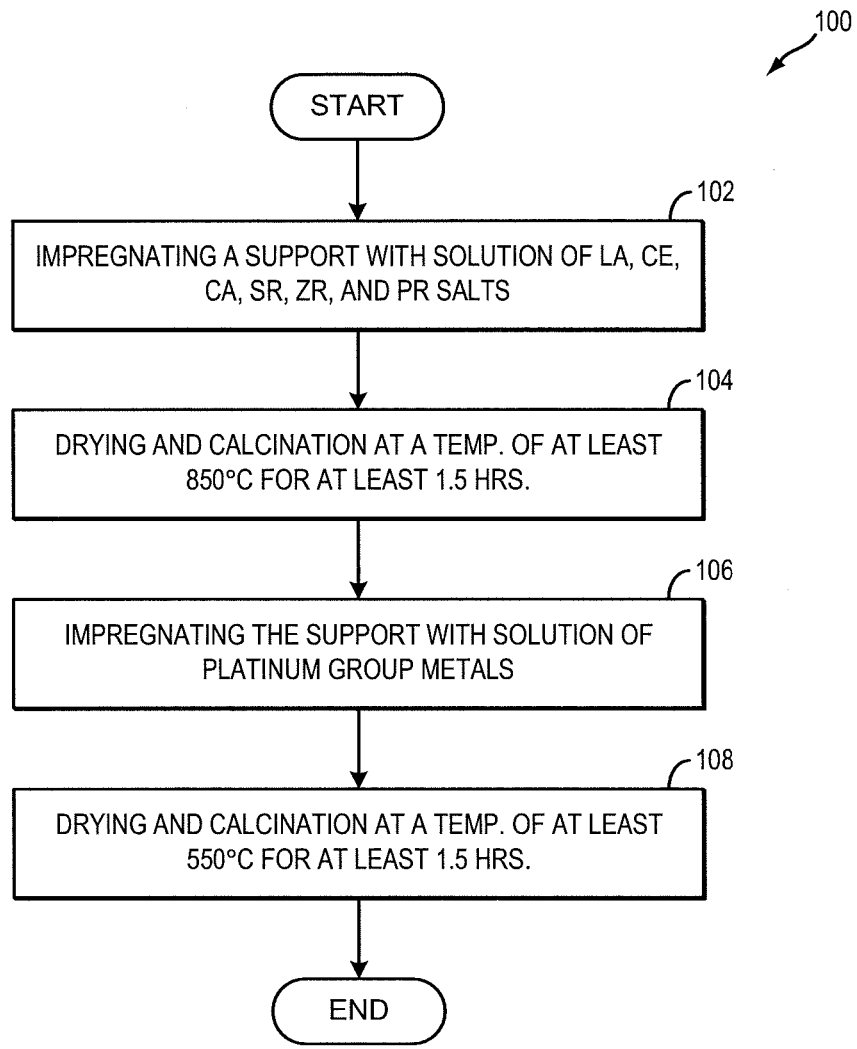
FIG. 13: shows a flow chart illustrating a method for producing an LNT catalyst according to an embodiment of the present disclosure.

FIG. 13 is flow chart illustrating a method 100 for the production of an LNT catalyst according to an embodiment of the present disclosure. Method 100 includes, at 102, impregnation of a support with a solution of La, Ce, Ca, Sr, Zr, and Pr salts respectively. At 104, method 100 includes drying and afterwards calcinations at a temperature of at least 850° C. for at least 1.5 h. At 106, method 100 comprises impregnation of the support containing the mixed oxide with a solution of platinum group metals. At 108, method 100 includes drying and afterwards calcinations of the PGM-impregnated support at a temperature of at least 550° C. for at least 1.5 h.

Impregnation of the support with a solution of La, Ce, Ca, Sr, Zr, and Pr salts, respectively, may further comprise impregnation of the support with an aqueous solution of nitrite salts further containing urea, and drying and afterwards calcinations at a temperature of at least 850° C. for at least 1.5 h may further comprise drying at 88° C. for about 10 h, then drying at 100° C. with following calcinations at 900° C. for 2 h.

Impregnation of the support containing the mixed oxide with the solution of the platinum group metals may further comprise impregnation of the support containing the mixed oxide with an aqueous solution of non-chlorine salts of these metals further containing citric acid and urea, and drying and afterwards calcinations of the PGM-impregnated support at a temperature of at least 550° C. for at least 1.5 h may further comprise drying at about 88° C. for about 10 h, then drying at 100° C. at 600° C. for 2 h.

Figure 14:
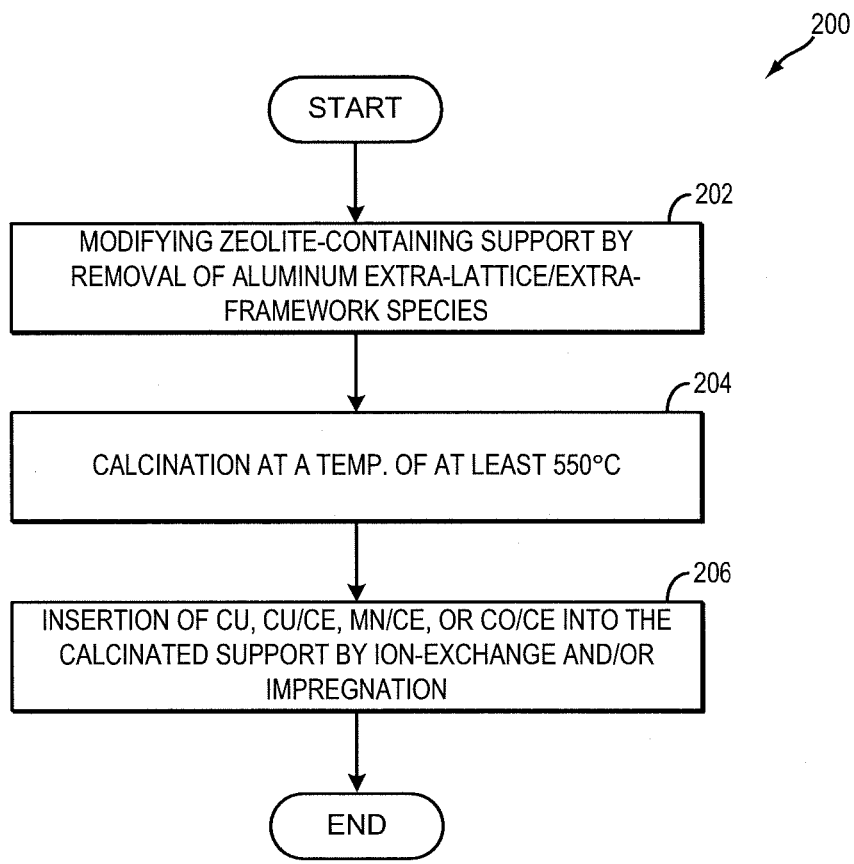
FIG. 14: shows a flow chart illustrating a method for producing an SCR catalyst according to an embodiment of the present disclosure.

FIG. 14 is a flow chart illustrating a method 200 for preparing an SCR catalyst according to an embodiment of the present disclosure. Method 200 includes, at 202, modifying a zeolite-containing support by essential removal of aluminum extra-lattice/extra-framework species from the zeolite. At 204, method 200 includes calcinations of the modified zeolite-containing support at a temperature of at least 550° C. At 206, insertion of Cu, Cu/Ce, Mn/Ce or Co/Ce into the calcined support by ion-exchange and/or impregnation is performed.

The method may also include the SCR catalyst being Cu/modified zeolite, Cu—Ce, Mn—Ce or Co—Ce/modified zeolite for reduction of NOx in exhaust gases. The method may also include the insertion of Cu, Cu/Ce, Mn/Ce or Co/Ce into the calcined support by ion-exchange and/or impregnation being carried out in the presence of urea, in particular using an aqueous solution with nitrate salts of Cu, Ce, Mn and Co, respectively.

The method may also comprise the insertion of Cu, Cu/Ce, Mn/Ce or Co/Ce into the calcined support by ion-exchange and/or impregnation being followed by drying for a period of at least 6 hours, in particular at a temperature of 88° C., and calcinations at temperature of at least 550° C., preferably at 600° C.

The support may contain Cu/zeolite including a commercial catalyst on cordierite or another support, whereas the removal may comprise essential removal of copper and aluminum extra-lattice/extra-framework species from the zeolite. The calcinations of the modified zeolite-containing support at a temperature of at least 550° C. may further comprise calcinations of the modified zeolite-containing support at a temperature of 600° C.

The removal of Cu and/or Al extra-lattice species may be carried out with citrate containing solution, in particular comprising citric acid and diammonium hydrogen citrate, whereas the removal and calcinations steps may be repeated at least once, and the SCR catalyst may be positioned downstream of an LNT catalyst.

Modifying the zeolite-containing support by essential removal of aluminum extra-lattice/extra-framework species from the zeolite may be performed at a temperature of 80-100° C., preferably of 97° C.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A catalyst system for an exhaust gas treatment system, comprising:
   a LNT-catalyst including a mixed metal oxide having proton conducting properties and a combination of at least two platinum group metals (PGM) on a support, wherein the mixed metal oxide is a lanthanum-cerium-oxide, in which up to 40 mol-% of lanthanum is replaced by calcium and/or strontium, wherein at least some lanthanum is replaced by calcium and/or strontium; and
   a SCR-catalyst, wherein the SCR-catalyst is positioned downstream of the LNT-catalyst;
   wherein the catalyst system has no external ammonia source.

2. The catalyst system according to claim 1, wherein the mixed metal oxide has defect fluorite structure, and wherein 10-20 mol-% of the lanthanum is replaced by calcium and/or strontium.

3. The catalyst system according to claim 1, wherein up to 66 mol-% of cerium is replaced by zirconium and/or praseodymium.

4. The catalyst system according to claim 1, wherein the platinum group metals further comprise Pt and Pd or Pt—Pd—Rh combination.

5. The catalyst system according to claim 1, wherein a total loading of platinum group metals is 100 g/ft3 or less and wherein a Pt-loading is 10-70 g/ft3.

6. The catalyst system according to claim 1, wherein a Pd-loading is 5-40 g/ft3 and wherein a Rh-loading is 0-10 g/ft3.

7. A catalyst system for an exhaust gas treatment system, comprising:
   a LNT-catalyst including a mixed metal oxide having proton conducting properties and a combination of at least two platinum group metals (PGM) on a support, wherein the mixed metal oxide is a lanthanum-cerium-oxide, in which up to 40 mol-% of lanthanum is replaced by calcium and/or strontium; and
   a SCR-catalyst, wherein the SCR-catalyst is positioned downstream of the LNT-catalyst;
   wherein the catalyst system has no external ammonia sources, and wherein the support is cordierite provided with an alumina washcoat.

8. A catalyst system for an exhaust gas treatment system comprising:
   a LNT-catalyst that generates ammonia, wherein the LNT-catalyst includes a mixed metal oxide having proton conducting properties and a combination of at least two platinum group metals (PGM) on a support; and
   a SCR-catalyst comprising a zeolite-containing support, wherein the support has been removed of aluminum extra-lattice/extra-framework species to form a modified zeolite-containing support, wherein a Cu, Cu—Ce, Mn—Ce, or Co—Ce catalyst has been reinserted into the modified zeolite-containing support.

9. The catalyst system of claim 8, wherein the LNT-catalyst generates ammonia during rich pulses and wherein the catalyst system has no external ammonia source.

10. The catalyst system of claim 9, where the LNT-catalyst comprises the mixed metal oxide having proton conducting properties and the combination of the at least two platinum group metals (PGM) on the support and wherein a total loading of platinum group metals is 100 g/ft3 or less and wherein a Pt-loading is 10-70 g/ft3.

11. The catalyst system of claim 10, wherein removal of Cu and/or aluminum extra-lattice species is carried out with a citrate containing solution, comprising citric acid and diammonium hydrogen citrate, wherein the support has been removed of Cu and/or aluminum extra-lattice species and calcined in steps that are repeated at least once.

12. The catalyst system of claim 8, wherein the zeolite-containing support contains Cu/zeolite including a commercial catalyst on cordierite or another support, wherein the zeolite-containing support is further removed of copper before reinsertion, and wherein the modified zeolite-containing support has been calcined at a temperature of at least 550° C.

13. The catalyst system of claim 8, wherein the modified zeolite-containing support is removed of aluminum extra-lattice/extra-framework species at a temperature of 80-100° C.

14. The catalyst system of claim 8, wherein the Cu, Cu—Ce, Mn—Ce, or Co—Ce catalyst is reinserted into a calcined modified zeolite-containing support by ion-exchange and/or impregnation in a presence of urea by using an aqueous solution with nitrate salts of Cu, Ce, Mn and Co, respectively.

15. The catalyst system of claim 8, wherein the SCR-catalyst is Cu/modified zeolite, Cu—Ce, Mn—Ce or Co—Ce/modified zeolite for reduction of NOx in exhaust gases.

16. The catalyst system of claim 15, wherein the SCR-catalyst uses the ammonia generated by the LNT-catalyst for the reduction of NOx in exhaust gases.

* * * * *